United States Patent
Shono et al.

(10) Patent No.: US 9,849,391 B2
(45) Date of Patent: Dec. 26, 2017

(54) GAME CONTROL METHOD AND SERVER FOR SOCIAL GAME FOR DEVELOPING A SOCIAL NETWORK

(71) Applicant: CRAFTS & MEISTER CO., Ltd., Chuo-ku, Osaka (JP)

(72) Inventors: Takashi Shono, Osaka (JP); Noritaka Funamizu, Osaka (JP)

(73) Assignee: CRAFTS & MEISTER CO., LTD., Osaka (JP)

( * ) Notice: Subject to any disclaimer, the term of this patent is extended or adjusted under 35 U.S.C. 154(b) by 437 days.

(21) Appl. No.: 14/089,462

(22) Filed: Nov. 25, 2013

(65) Prior Publication Data

US 2014/0295943 A1 Oct. 2, 2014

Related U.S. Application Data

(63) Continuation-in-part of application No. 13/852,054, filed on Mar. 28, 2013, now abandoned.

(60) Provisional application No. 61/826,834, filed on May 23, 2013.

(51) Int. Cl.
| | |
|---|---|
| *A63F 9/24* | (2006.01) |
| *A63F 13/00* | (2014.01) |
| *G06F 17/00* | (2006.01) |
| *G06F 19/00* | (2011.01) |
| *A63F 13/795* | (2014.01) |
| *A63F 13/792* | (2014.01) |
| *A63F 13/71* | (2014.01) |

(52) U.S. Cl.
CPC .......... *A63F 13/795* (2014.09); *A63F 13/792* (2014.09); *A63F 13/71* (2014.09)

(58) Field of Classification Search
CPC ................................ A63F 13/847; A63F 13/00
See application file for complete search history.

(56) References Cited

U.S. PATENT DOCUMENTS

2008/0287198 A1* 11/2008 Callery .................. G07F 17/32
463/42

OTHER PUBLICATIONS

Age of Empires II: The Age of the Kings manual, Microsoft Corporation, 1999.*
Age of Empires Wikia: Villager (Age of Empires II), Release Date: Sep. 30, 1999, <http://ageofempires.wikia.com/wiki/Villager_(Age_of_Empires_II)>.*

* cited by examiner

*Primary Examiner* — Milap Shah
*Assistant Examiner* — Jason Pinheiro
(74) *Attorney, Agent, or Firm* — KMF Patent Services, PLLC; Kenneth M. Fagin; S. Peter Konzel

(57) ABSTRACT

A game controlling method in a social game in which a one-on-one match-up is conducted among registered users using one or more items selected from possession items. According to the game controlling method, a plurality of general items and a plurality of special items are stored in a database in advance, the general items being items which the registered users may possess, and the special items being items which a registered user belonging to a group may possess and a registered user not belonging to a group may not possess.

9 Claims, 41 Drawing Sheets

FIG.31

| Probability | Case 1 | Case 2 |
|---|---|---|
| 10% | Technique 1 | Technique 5 |
| 15% | Technique 2 | Technique 4 |
| 20% | Technique 3 | Technique 3 |
| 25% | Technique 4 | Technique 2 |
| 30% | Technique 5 | Technique 1 |

FIG.32

| Technique | Hit Distance | Reaction | Action Initiate Time | Power |
|---|---|---|---|---|
| A | H1 | W1 | T1 | P1 |
| B | H2 | W2 | T2 | P2 |
| C | H3 | W3 | T3 | P3 |

| Item | classification | cost |
|---|---|---|
| A | 0 | 10 |
| B | 0 | 30 |
| H | 1 | 50 |
| I | 1 | 100 |
| P | 2 | 0 |
| ... | ... | ... |

FIG.40

| Group | Name | Item 1 | Item 2 | Item 3 |
|---|---|---|---|---|
| 0001 | AAA | J | L | M |
| 0002 | BBB | H | I | J |
| 0003 | CCC | K | J | — |
| 0004 | DDD | H | — | — |
| ... | ... | ... | ... | ... |

FIG.41

| User | Group |
|---|---|
| 00000001 | 0001 |
| 00000002 | 0001 |
| 00000003 | 0002 |
| 00000004 | 0003 |
| ... | ... |

| User | Item 1 | Item 2 | Item 3 | Item 4 | Item 5 |
|---|---|---|---|---|---|
| 00000001 | A | D | E | M | L |
| 00000002 | B | C | G | J | M |
| 00000003 | E | F | H | I | J |
| 00000004 | A | C | E | K | J |
| ... | ... | ... | ... | ... | ... |

GAME CONTROL METHOD AND SERVER FOR SOCIAL GAME FOR DEVELOPING A SOCIAL NETWORK

CROSS-REFERENCE TO RELATED APPLICATIONS

This application is a non-provisional of application No. 61/826,834 filed May 23, 2013, as well as a continuation-in-part of application Ser. No. 13/852,054 filed Mar. 28, 2013. The benefit and priority benefit of both earlier applications is claimed, and the content of both earlier applications is incorporated herein by reference.

BACKGROUND OF THE INVENTION

1. Field of the Invention

The present invention relates to a game control method and a server device suitable for developing a social network among a plurality of users in a social game such as a fighting game or a card game which registered users play one-on-one.

2. Description of Related Art

In recent years, social games using a social networking service (SNS) and intended to develop social relationships among registered users have been in fashion.

Social game is defined as a "Game provided on a Social Networking Service. Social games are played via the internet and, unlike conventional video games, it is not necessary to purchase hardware and software in advance and, in general, it can be played for free using a computer or hand phone with internet connectivity. While a social game can be registered for and initiated with free of charge generally, its business model is to offer various items by charging on a deferred payment basis the registered users hoping to be advantageous in the game. As a social game is a game using the internet, unlike conventional game software provided as a software package, it is possible to manage with updates such as adding new functions. Further, one of the characteristics of social games is, with a comparatively easy operation, it can be enjoyed easily." Another definition is as follows. Social game is a game deployed on an application platform provided by a social networking service. Social game may be also called as a "Social Networking Service Game". Social game is an online game successfully involving social relationships among SNS users within the game system and in general, is operated in the internet browser or on an installed application of the registered users' client terminals.

In general, in a social game, determination of a game operation and recording of game information is conducted on the server device and the client terminal corresponds to a display device for the determined operation. Therefore, the client terminal can be selected without any restriction on functions or types and it is possible to deploy on an information device or information tools such as a hand phone, smart phone or PC, which are already widely used. Hence, the strength of a social game is to be able to access a large number of people and social games have been increasing the market share in the game industry. It is said that the price reduction on consumer game devices in summer 2011 was for the purpose of countering social games by in consideration of the disadvantage of the consumer game devices that dedicated hardware is required to play a game. Most of the titles are made based on the concept of gathering many registered users widely and the content of a game is very simple and can be played in a very short time, for example, on a work break. It is totally the opposite idea to a game design for entertaining users to make them deeply involved in the game world. Those players who are engrossed with this type of game do not consider a difficult or intricate game as a "challenging game" but consider it as a "boring game" or "bothering game". However, there still are many who enjoy both of those conventional difficult games and social games, considering conventional games and social games as separate games. The basic play of many titles is "free to play" and ultrahigh-spending registered users, who spend a large amount of real money on online games and account for about 3% of all registered users, and registered users who spend about a few thousand Japanese yen per month are the major source of profit. Although 70 to 80% of the registered users play totally free of charge, they are important for game providers as they may become chargeable registered users in the future, they may become a hunting target who are easily defeated by money spending users in a match-up element among users, and they may act as a loser necessary for the spending users to feel superior thinking "I am strong and I am superb."

As such, the characteristics of a social game is that, by lowering the hurdle to participate in a game compared to conventional consumer games which require users to purchase a dedicated gaming device and play with dedicated software, registered users who spend a lot of money to be advantageous in the game, and registered users who play for free not willing to be advantageous in the game, and registered users who are in the middle and willing to play by interacting with each other are able to play the game interacting with a wide range of people.

When a match-up game such as a fighting or card game where registered users play a one-on-one match-up online was applied to a social game, both of the users in the match-up were required to maintain a constant internet connection. However, as an online match-up game cannot be played if users become offline during the game or the connection is disrupted due to the change in connection condition, the social game with users who prefer to play in a short time between their errands was not suitable for this type of social game. Therefore, there has been no genre such as a fighting game or card game in a social game, or very few if any.

As one method, the inventors of the present invention came up with a game in which the order of input actions such as attack and guard in a fighting game or the order of cards used in a card game is set in advance and a match-up is played with other users at a predetermined timing based on the preset contents. However, although this enables to solve the issue to avoid a situation where it was impossible to continue due to the communication cut or game stop by user's secede, there was still an issue of lack of close social interactions among users in social games. For example, in a strategic type of game where registered users are required to expand their territory, each registered user becomes the owner of the territory and form alliances with other registered users or become dependent after a loss. This provides the social amusingness of a social game. However, in a one-on-one match-up game such as a fighting or card game, it is difficult to create a situation where users are required to cooperatively accomplish the mission, and also difficult for the registered users to find benefits from making an alliance.

The inventors of the present invention thought it is necessary to have a game control enabling to develop a social network among registered users, to give the benefit to registered users belonging to a certain group and to organically relates to a fighting and card game.

SUMMARY OF THE INVENTION

The present invention is a game controlling method in a social game in which a one-on-one match-up is conducted among registered users using one or more items selected from possession items; the method comprising: storing, in advance, in a database a plurality of general items and a plurality of special items, the general items being items which the registered users may possess, and the special items being items which said registered user belonging to a group may possess and said registered user not belonging to a group may not possess; according to a request from a first registered user requesting a generation of the group, storing in the database the generated group associated with at least one or more of the special items; and
according to a request from a second registered user requesting participation in the group, storing in the database the second registered user associated with the group and giving the second registered user the right to possess one or more of the special items associated with the group.

According to the above structure, the special item is associated with the group by the first registered user generating the group. And the second registered user to participate in this group may select the special item associated with the group. As the group is associated with the special item selected by the first registered user generating the group, the second registered user may enjoy the benefit of possessing different special items depending on the group which the second registered user participates in. Hence, the registered users are given meaning of participating in a group and it may promote building the social connection among the registered users within the group by belonging therein.

Further, in the game controlling method of the present invention, the special items are more advantageous to the game than the general items.

Further, in the game controlling method of the present invention, a consumption cost is set for said special item in advance, and the first registered user may associate the special item with a group in exchange for a possession cost possessed by the first registered user.

Further, in the game controlling method of the present invention, a consumption cost is set for said item in advance and said registered user may possess the item in exchange for a possession cost possessed by the registered user.

Further, in the game controlling method of the present invention, said registered user may possess the possession cost by purchase on credit.

Further, in the game controlling method of the present invention, the possession cost increases according to an elapsed time.

Further, the present invention is a server configured to provide a game in which a one-on-one match-up is conducted among registered users using one or more items selected from possession items, the server: having a database in which a plurality of general items and a plurality of special items are registered, the general items being items which the registered users may possess, and the special items being items which said registered user belonging to a group may possess and said registered user not belonging to a group may not possess; according to a request from a first registered user requesting a generation of the group, storing in the database the generated group associated with at least one or more of the special items; and according to a request from a second registered user requesting participation in the group, storing in the database the second registered user associated with the group and giving the second registered user the right to possess one or more of the special items associated with the group.

BRIEF DESCRIPTION OF THE DRAWINGS

FIG. 31 shows an example of a technique selection table.

FIG. 32 shows an attribute of a technique used in a game control method according to an example of the social game.

FIG. 40 is a table showing group items.

FIG. 41 is a table showing groups users belong.

DETAILED DESCRIPTION OF THE INVENTION

The game control method and server of the present invention is suitable for a social game where registered users play a one-on-one match-up using one or more items selected from the items they possess. For example, the social game is a game such as a fighting game or match-up card game where registered users play a one-on-one match-up. An example of such match-up game will be explained in details referring to FIG. 1 to FIG. 34C.

Figure 35:
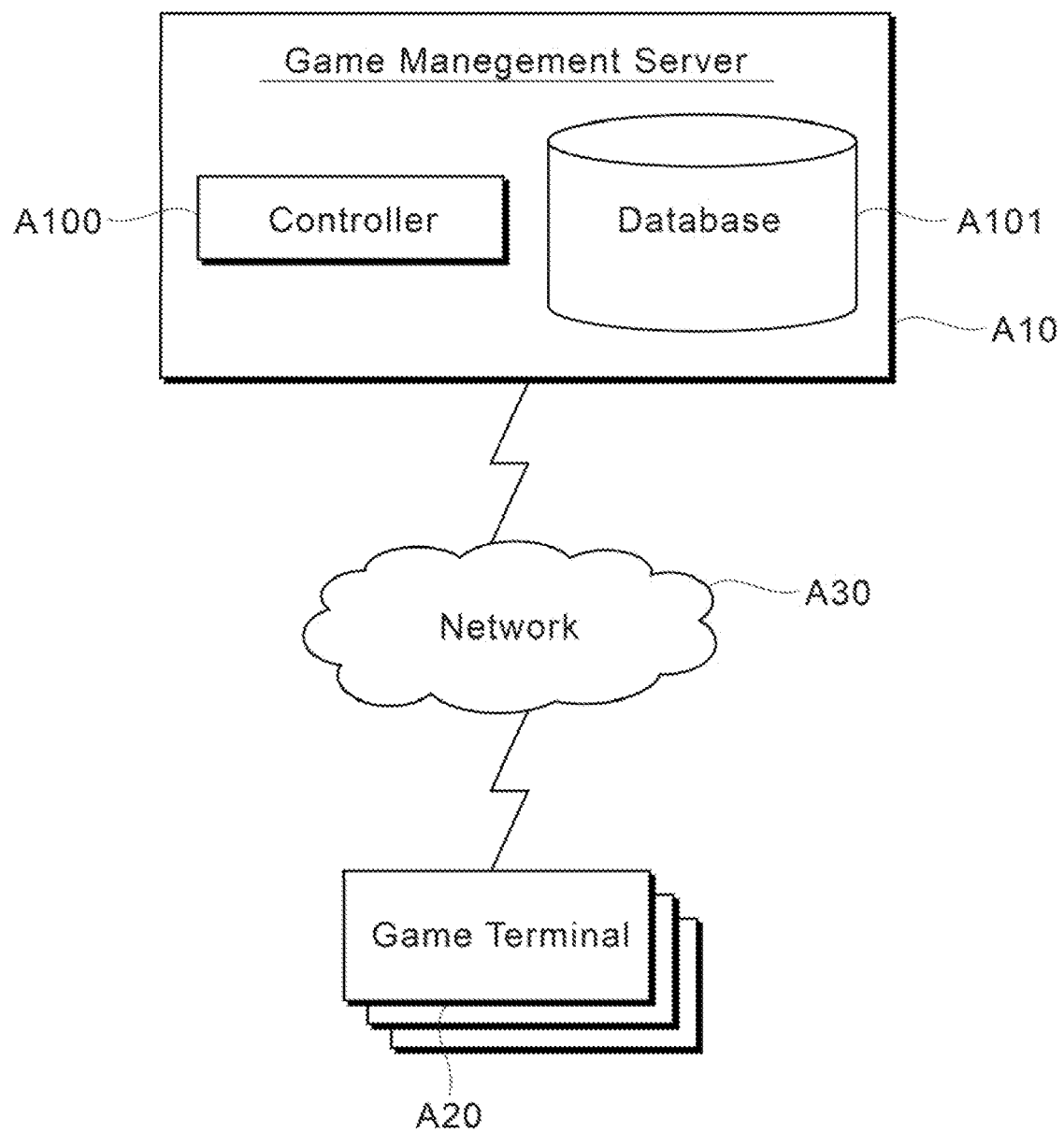
FIG. 35 is an explanatory diagram showing a structure of a game management server.

Such social game is mainly executed on a game management server A10 (server device) shown in FIG. 35. The game management server A10 is connectible through an internet A30 from a game terminal A20 (client terminal) which a registered user possesses. The game management server A10 comprises a controller A100 and a database A101. The game management server A10 is a computer and comprises memory devices such as a CPU (Central Processing Unit), EEPROM (Electrically Erasable and Programmable Read Only Memory) re-writeable storing programs executed by CPU and data used by these programs, and RAM (Random Access Memory) temporary storing data therein when executing a program. The game management server A10 realizes function of the controller A100 and the database A101 in cooperation with these hardware and software in the memory device. The game management server A10 is not limited to one computer and may be a plurality of computers having divided functions.

As such, the game management server A10 has an internal memory, a memory device and a communication module similar to an example of the social game which will be described later. (see FIG. 4) Further, the game terminal A20 has a controller, an internal memory, a memory device and a communication module similar to an example of the social game which will be described later. (see FIG. 4)

A "registered user" is a user having an account for a social game. The registered user is able to operate a social game by logging in to the account.

Further, an "item" is set in advance in order for the registered user to play a match-up with other registered users. For example, an "item" is such as a card in which operations of attacking or guarding action techniques of avatars (virtual character of the registered user on the internet) in a fighting game or status in (attacking power, guarding power, character) in a card game is set. If the registered user sets one or more "items" prior to the game, a one-on-one match-up by the registered users will be conducted at a predetermined timing with the set "items". That is, for the registered user, the match-up is automatically conducted by setting the "items" at a desired timing.

"Registered user's item" is an "item" which the registered user can set for a game in a social game. The "item" can be possessed in exchange for a cost which the registered user has. The cost is a currency in a social game, which increases by charging (purchase on credit) or as time elapses. In other words, the registered user is able to possess "items" by consuming a cost.

Figure 36:
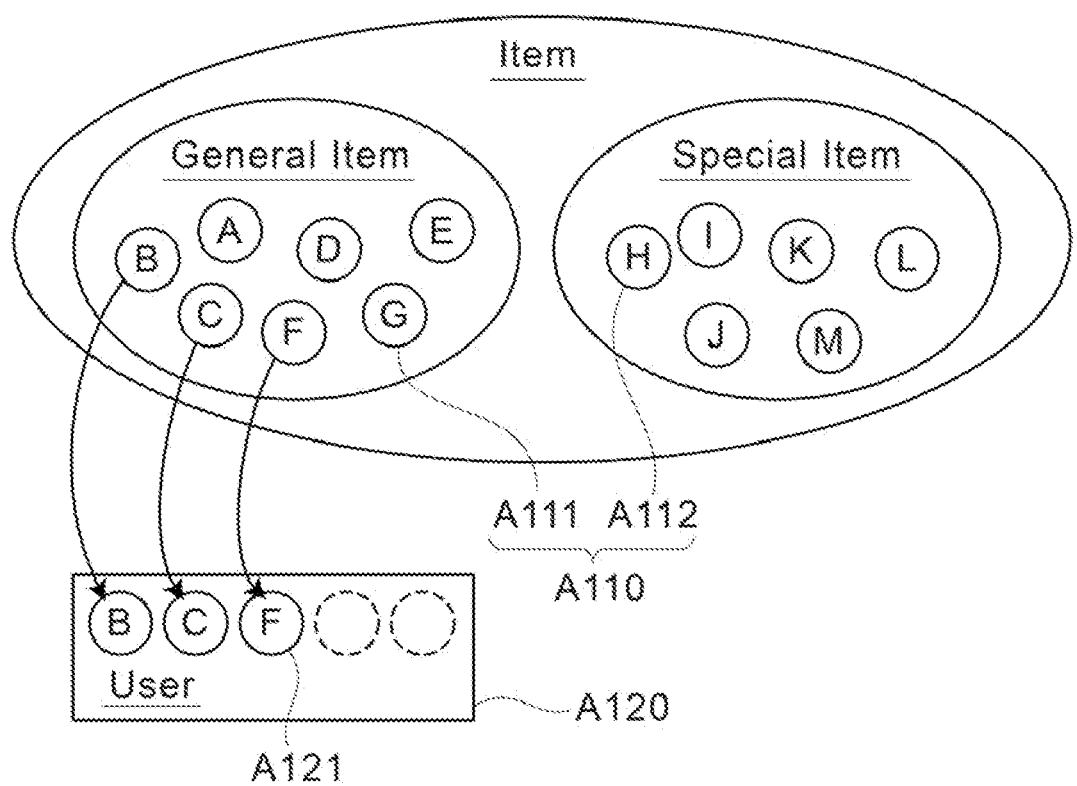

In the present embodiment, a plurality of items A110 are registered in advance in the database A101 of the game management server A10. As shown in FIG. 36, the items A110 are at least classified into a plurality of general items A111 and a plurality of special items A112. Any registered user may possess the general items A111. That is, the registered user may obtain an item by consuming a cost and register it as his/her possession item A121.

As shown in FIG. 36, in the present embodiment, a registered user A120 may register five possession items A121 but it is not limited to that. It is possible to randomly obtain a general item A111 by consuming a predetermined cost, or obtain a desired general item A111 by consuming a preset cost.

Figure 37:
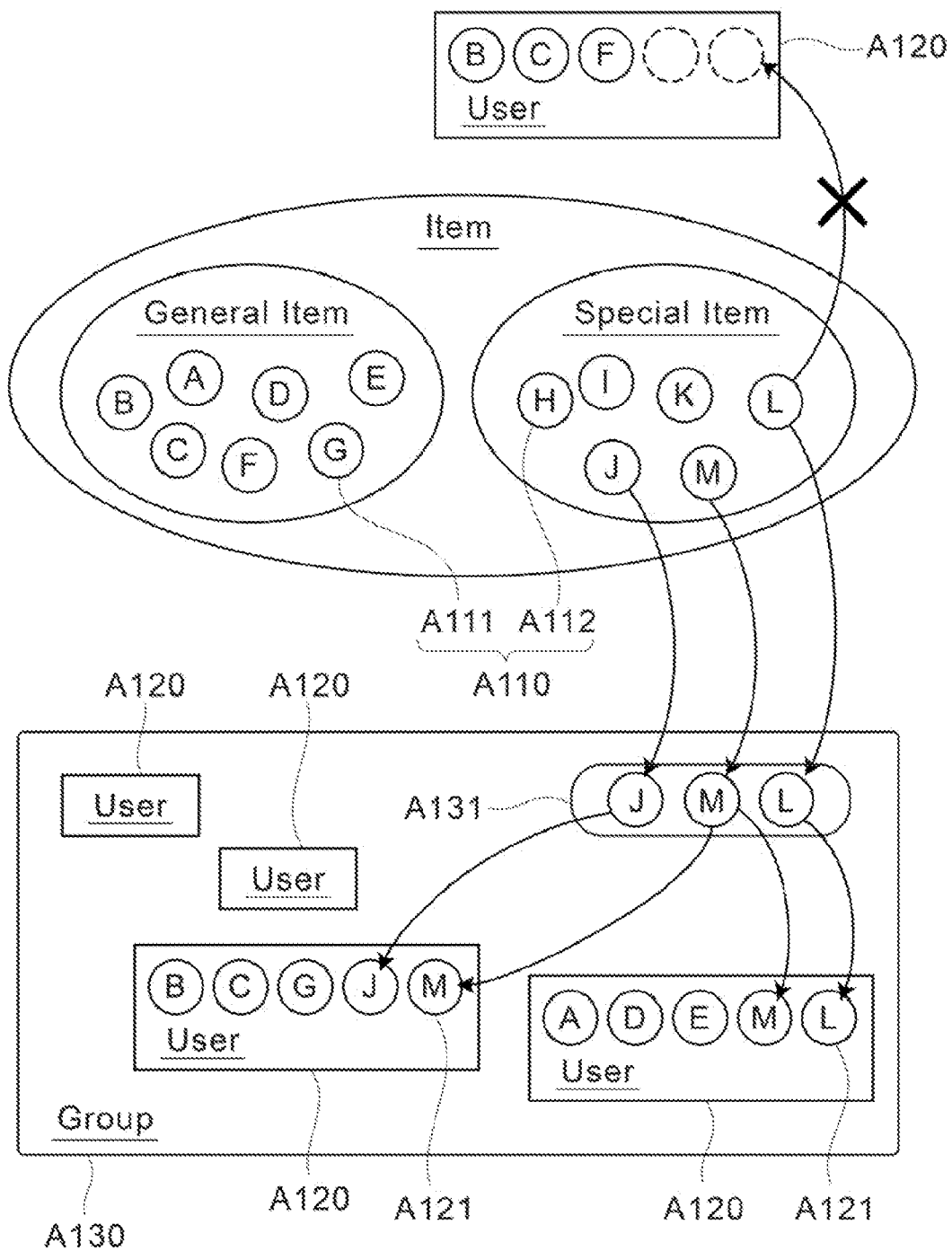
FIG. 37 is an explanatory diagram showing an outline of the social game.

As shown in FIG. 37, a registered user A120 in a group A130 may possess special items A112 but a registered user A120 not in the group A130 may not possess special items A112. That is, a registered user A120 may possess a special item A112 associated with the group A130 by participating in said group. Further, a registered user A120 in the group A130 may obtain one or more special items A120 from the plurality of special items A120 (a group item A131) associated with the group A130.

The group A130 is generated by any registered user A120. The registered user A120 (a first registered user) generating the group A130 determines one or more group items A131 from a plurality of special items A112 when generating the group A130. Group items A131 may be determined by the first registered user's selection or may be determined randomly. Further, the group A130 may be generated by consuming a cost. Group items A131 may be determined by consuming a cost.

A registered user A120 who sends request and participate in the group A130 (a second registered user) may obtain and possess one or more special items A112 from the group items A131 of said group A130. Special items A112 to be obtained from the group items A131 by the second regis- tered user may be determined by the second user's selection or randomly. The second registered user may obtain a special item A112 of the group item A131 by consuming a cost.

The first registered user and the second registered user are distinguished from each other by the differences of their operations and not by account. Therefore, all the registered users may generate a group and may belong to a group. The registered user who generated a group may mandatorily belong to the group that the user generated, or may belong to another group. The registered user may belong to a plurality of groups.

Figures 38, 39:
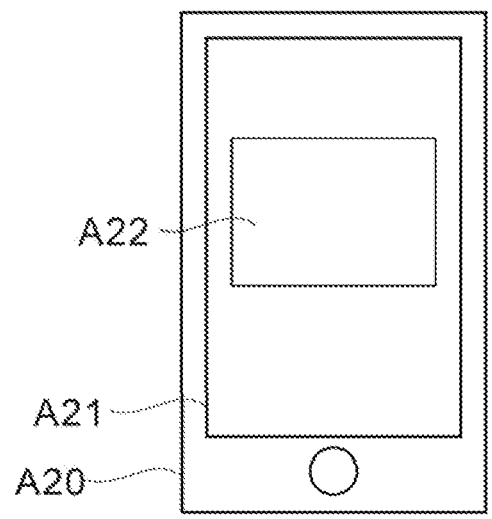
FIG. 38 is an explanatory diagram showing the game terminal.
FIG. 39 is a table showing item classification definitions.

The registered user operates the game terminal A20 as the first registered user or as the second registered user. As shown in FIG. 38, the game terminal A20 has a touch screen panel A21. The game terminal A20 receives the response from the game management server A10 and displays contents of the response on a display device such as the touch screen panel A21 of the game terminal A20. The contents of the response may be displayed in a web browser or may be displayed by dedicated application software. The game terminal A20 may be a hand phone, a tablet terminal such as a smart phone, or a PC.

The touch screen panel A21 also act as an input device of the game terminal A20. That is, the game terminal A20 may send a request to the game management server A10 according to input from the registered user to the touch screen panel A21. For example, as shown in FIG. 38, the game terminal A20 displays a for-input image A22 on the touch screen panel A21. The for-input image A22 may include such as buttons, text fields, radio buttons and check boxes.

For example, the game terminal A20 accepts input from the registered user by touch operation to the for-input image A22 and sends the input contents to the game management server A10 as a request. Upon receipt of the request from the game terminal A20, the game management server A10 executes an operation predetermined depending on each request. As such, the game terminal A20 mainly functions as an input device and display device in a social game.

(Game Management Server)

The game management server A10 will be explained in details below.

The database A101 of the game management server A10 has various tables as shown below.

(Definition Table for Item Kind)

FIG. 39 is an item classification definition table. The item classification definition table is a table defining under what conditions each item (such as a technique or card) can be possessed.

The item classification definition table has item columns and classification columns. In the item columns, IDs (item ID) for identifying items are stored. In the classification columns, IDs for identifying classifications of items are stored. The items in the current embodiment are classified into the general item A111 which the registered users may possess, the special item A112 which a registered user in a group may possess and a registered user not in the group may not possess, and a conditioned item A113 which a registered user may possess by fulfilling a predetermined condition in a social game.

In the item classification definition table, the general item is shown as "0", the special item is shown as "1" and the conditioned item is shown as "2". Conditioned items A113 may have different conditions from each other, or multiple conditions may be set to one conditioned item A113. The conditioned item A113 may be obtained automatically by the registered user fulfilling the set condition in the social game. Alternatively, the right to obtain the conditioned item A113 may be given by fulfilling the set condition in the social game.

The item classification definition table is referred to when the registered user obtains an item. For example, when the registered user obtains a general item, the user may obtain only from the general items with the classification "0" by consuming a set cost. Further, the definition of each item itself (name of the item, action status etc.) is defined in association with the item ID in a separate table which is not shown.

This item classification definition table usually does not change. That is, the game management server A10 does not change, add or delete data in the item category definition table by receiving a request from the game terminal A20. In other words, a social game administrator changes, adds or deletes data in the item category definition table only for the purpose of server maintenance or the like of the game management server A10.

(Group Item Table)

FIG. 40 shows a group item table. The group item table is a table storing therein generated groups in association with special items A112.

The group item table has group columns, name columns and item 1-3 columns. In the name columns, group names are stored. In the group columns, IDs (group ID) for identifying groups are stored. An identification number is assigned to a group A130 when the registered user A120 generates the group. In the item 1-3 columns, special items A112 associated with groups are stored. In the present embodiment, each group A130 is associated with three special items A112 at a maximum, but not limited to this.

In the item classification definition table, new data is added when the registered user A120 generates a group. The item classification definition table is referred to when the registered user A120 participates in the group A130 and obtains a special item A112.

(User Belonging Group Table)

FIG. 41 shows a user belonging group table. The user belonging group table is a table storing therein groups which users belong to.

The user's group table has user columns and group columns. In the user columns, IDs (user ID) for identifying users are stored. The user IDs may correspond to account IDs for a social game or unique numbers associated with the account IDs. In the group columns, IDs for identifying groups are stored. Hence, a registered user A120 is associated with a group A130.

New data is added to the item classification definition table when the registered user A120 participates in a group. The item classification definition table is referred to when the registered user A120 obtains a special item A112.

(User Possession Item Table)

Figures 42, 43:
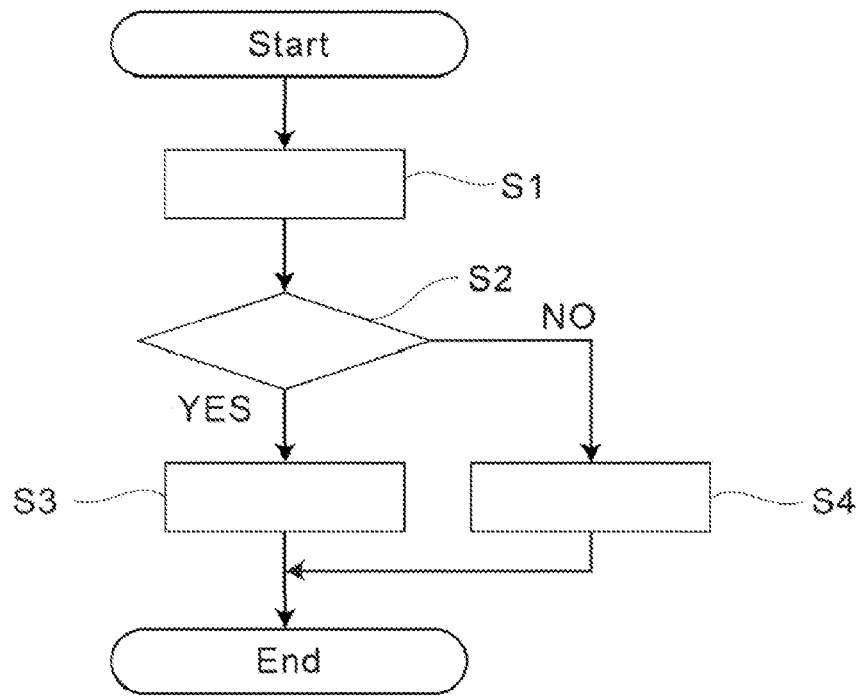
FIG. 42 is a table showing user's items.
FIG. 43 is a flowchart of a process of group generation/participation determination.

FIG. 42 shows a user possession item table. The user possession item table is a table storing therein items which users possess.

The user possession item table has user columns and item 1-5 columns. The user columns store IDs (user ID) for identifying users. The item 1-5 columns store item IDs for items which registered users possess. The user possession item table is updated every time the registered user A120 updates an item.

The database A101 including these various tables is not limited to the above and may be normalized or may be redundant. The database A101 includes a table for a social game such as the table used in the example of a social game which will be described later, and a table for registered user management (a storage table for personal information or the like defined as registered user IDs).

(Operation of the Game Management Server)

Next, an operation of the game management server A10 is mainly explained.

(Group Generation/Participation Determination Process)

Referring to FIG. 43, a group generation/participation determination process which a controller A100 of the game management server A10 executes will be explained. The group generation/participation determination process starts when generating an account for a social game, or upon receiving a request to participate in a group, for example, when the for-input image A22 for requesting generation of or participation in the group A130 at the game terminal A20 is operated.

First, the controller A100 transmits a response to the game terminal A20 requesting to determine whether to generate a new group A130 or participate in an existing group A130 (S1). The game terminal A20 which received the response then displays, as the for-input image A22, the above options for selection on the touch screen panel A21.

Next, the controller A100 determines whether the request from the game terminal A20 is to generate a new group A130 or not (participate in the existing group A130) (S2). The controller A100 executes the group generation process if the request from the game terminal A20 is to generate a new group A130 (S2: YES) (S3). The controller A100 executes the group participation process if the request from the game terminal A20 is to participate in the existing group A130 (S2: NO). (S4) Then, this routine ends.

(Group Generation Process)

Figure 44:
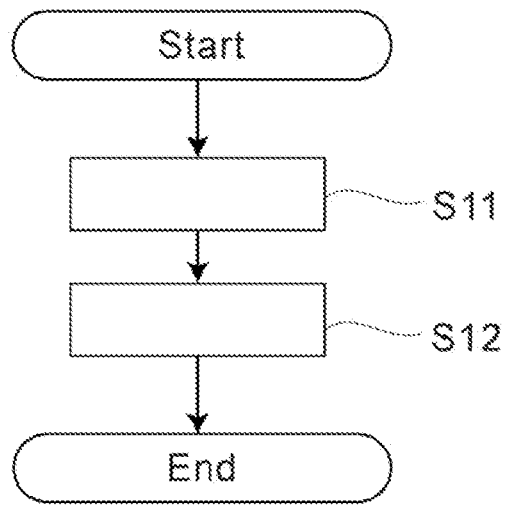
FIG. 44 is a flowchart of a process of group generation

Referring to FIG. 44, the group generation process executed by the controller A100 of the game management server A10 in the group generation/participation determination process will be explained. First, the controller A100 transmits a response to the registered user requesting to determine the name of a group to be newly generated and to select a special item A112 to be associated with it (S11). The game terminal A20 which received the response then displays, as the for-input image A22, a text field for inputting the group name and the above options for selection on the touch screen panel A21.

Next, the controller A100 newly stores in the group item table (FIG. 40) the group name included in the request from the game terminal A20 and the selected special item A112 in association with numbered group IDs (S12). This process then ends. As such, according to a request from the first registered user Al20 to generate a group A130, the game managing server A10 stores in the database A101 the generated group A130 associated with at least one or more of the special items A112.

(Group Participation Process)

Figure 45:
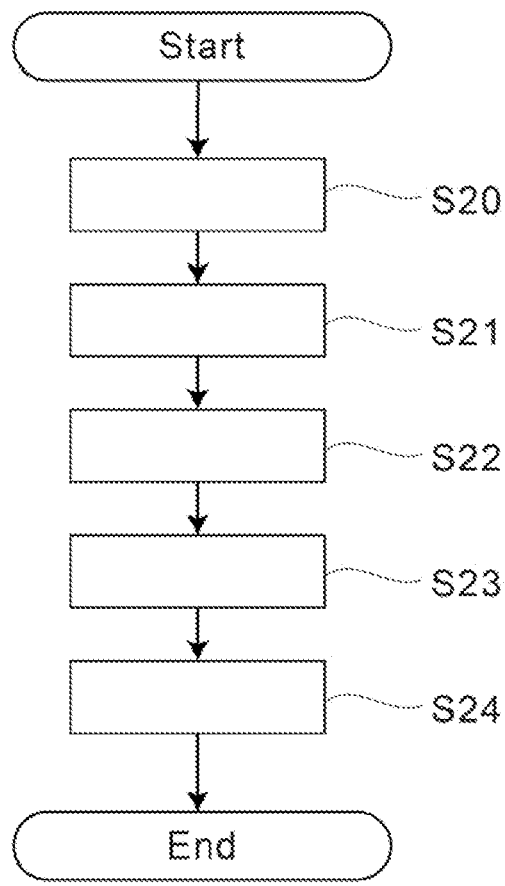
FIG. 45 is a flowchart of a process of group participation.

Referring to FIG. 45, a group participation process which the controller A100 of the game management server A10 executes during the group generation/participation determination process will be explained. First, the controller A100 transmits a response requesting to select an existing group A130 (S20). This response may include a name associated with the existing group A130 and the content of a special item A112. In this case, the group item table (FIG. 40) or a data table in which, for example, status of each item itself is defined, which is not shown, are referred to. The game terminal A20 that received a response displays options for selecting a group as a for-input image A22.

Next, based on the selected group included in the request from the game terminal A20, the controller A100 newly stores in the user's group table (see FIG. 41) the group ID of said group in association with the ID of the registered user who made the request. And the controller A100 refers to all the group items associated with the selected group, from the group item table. (S22) Then, a response requesting to select a special item A112 is transmitted. (S23) Here, the game terminal A20 which received the response displays all the special item A112 associated with the selected group A130 and all the items associated with said registered user in the user's item table (see FIG. 42), as for-input images A22 for a check list. That is, the registered user selects a restricted number (for example, not more than five) of items to possess.

Next, the controller A100 updates the item columns 1-5 of the user's item table (see FIG. 42) with the selected items A112 included in the request from the game terminal A20. The process then terminates. As such, the game management server A10 stores, in the database A101, said second registered user A120 in association with the group A130 according to the request from the second registered user requesting for participation in the group A130, and provides said second registered user A120 with the right to possess one or more special items A112 out of the group items A131 associated with said group A130.

Further, the detailed description above is mainly focused on characteristics of the present invention to fore the sake of easier understanding. The present invention is not limited to the above embodiments, and is applicable to diversity of other embodiments. Further, the terms and phraseology used in the present specification are adopted solely to provide specific illustration of the present invention, and in no case should the scope of the present invention be limited by such terms and phraseology. Further, it will be obvious for those skilled in the art that the other structures, systems, methods or the like are possible, within the spirit of the invention described in the present specification. The description of claims therefore shall encompass structures equivalent to the present invention, unless otherwise such structures are regarded as to depart from the spirit and scope of the present invention. Further, the abstract is provided to allow, through a simple investigation, quick analysis of the technical features and essences of the present invention by an intellectual property office, a general public institution, or one skilled in the art who is not fully familiarized with patent and legal or professional terminology. It is therefore not an intention of the abstract to limit the scope of the present invention which shall be construed on the basis of the description of the claims. To fully understand the object and effects of the present invention, it is strongly encouraged to sufficiently refer to disclosures of documents already made available.

The detailed description of the present invention provided hereinabove includes a process executed on a computer. The above descriptions and expressions are provided to allow the one skilled in the art to most efficiently understand the present invention. A process performed in or by respective steps yielding one result or blocks with a predetermined processing function described in the present specification shall be understood as a process with no self-contradiction. Further, the electrical or magnetic signal is transmitted/received and written in the respective steps or blocks. It should be noted that such a signal is expressed in the form of bit, value, symbol, text, terms, number, or the like solely for the sake of convenience. Although the present specification occasionally personifies the processes carried out in the steps or blocks, these processes are essentially executed by various devices. Further, the other structures necessary for the steps or blocks are obvious from the above descriptions.

Finally, examples of the social game which may apply the above game controlling method and the server are explained below referring to FIG. 1 to FIG. 34C.

The social game generally relates to a game control method and a recording medium.

Recently, game applications for terminals that use a touch screen panel as an input device are provided. Smart phones or tablets are examples of these terminals. The terminals access an application store, and download the game application from the application store. The terminals install the game application and execute the game application to perform a game of the game application.

A Fighting game is a video game where the player controls an on-screen character and engages in close Fight with an opponent character. A player of the Fighting game can use techniques such as attacking, blocking, counter-attacking, and chaining together sequences of attacks. A conventional Fighting game allows the player to execute various techniques by performing specific button combinations. However, it is difficult for the player to use the specific button combinations in the terminal using the touch screen panel.

An aspect of the social game provides a game control method and a recording medium for operating a Fighting game in a game terminal having a touch screen panel.

According to an aspect of the social game, a method of controlling a Fighting game is provided by a controller of a game terminal including the controller and a touch screen panel. The method includes receiving a selection of any one from among a plurality of avatars through the touch screen panel, the plurality of avatars corresponding to a plurality of other players, receiving, from a game management server, information on an avatar technique set including a plurality of technique that is set by other player corresponding to the selected avatar, and starting a match-up between a character corresponding to a player of the game terminal and the selected avatar. The method further includes repeatedly performing a process including selecting any one technique from among the plurality of techniques included in the avatar technique set and actuating the selected technique on the character.

When selecting any one technique, the controller may randomly select any one technique based on selection probabilities that are assigned to the plurality of techniques respectively.

The process may further include determining whether the actuated technique succeeds, and reducing stamina of the character corresponding to the player when the actuated technique succeeds.

Each of the plurality of techniques may have a power for determining a reducing amount of the stamina. In this case, when selecting any one technique, the controller may randomly select any one technique based on selection probabilities corresponding to the plurality of techniques. Further, a selection probability of a first technique having a first power may be higher than a selection probability of a second technique having a second power higher than the first power when a remaining amount of the stamina is less than a predetermined amount, and a selection probability of the first technique may be lower than a selection probability of the second technique when the remaining amount of the stamina is greater than the predetermined amount.

Each of the plurality of techniques may have a hit distance and an action initiate time. The process may further include determining that the actuated technique succeeds if a distance between the character and the avatar is within the hit distance when the action initiate time is lapsed from a time when the selected technique is actuated.

The method may further include reducing stamina with lapse of time, and ending the match-up when the stamina reaches zero. The plurality of techniques may correspond to a plurality of remaining amounts of the stamina. When selecting any one technique, the controller may select a technique corresponding to a remaining amount of the stamina from among the plurality of techniques.

The method may further include providing a result of the match-up to the game management server.

The method may further include receiving information on a technique set including a plurality of techniques through the touch screen panel, and starting a match-up between the character and a second character. The method may further include repeatedly performing a second process including receiving a touch on a predetermined area of the touch screen panel, selecting any one technique from among the plurality of techniques included in the technique set in response to the touch, and actuating the selected technique on the second character.

The plurality of techniques may be arranged in sequence in the technique set, and the plurality of techniques included in the technique set may be selected in sequence when any one technique is selected from among the plurality of techniques in the technique set.

The method may further include receiving a selection of a mission to be accomplished in the match-up between the character and the second character, and providing the player with a profit when the selected mission is accomplished.

The method selected mission may include a predetermined number of combos. The second process may further include determining whether the actuated technique succeeds, determining whether the actuated technique is continuous to a previous successful technique when the actuated technique succeeds, and incrementing a number of combos by one when the actuated technique is continuous to the previous successful technique. The method may further include determining that the selected mission is accomplished when the number of combos is equal to or greater than the predetermined number when the match-up between the character and the second character ends.

According to yet another aspect of the social game, a method of controlling a Fighting game is provided by a game management server. The method includes receiving, from each of a plurality of other players, information on an avatar corresponding to each of a plurality of other players, receiving a selection of any one from among a plurality of avatars corresponding to the plurality of other players from a game terminal, and transmitting, to the game terminal, information to an avatar technique set including a plurality of technique that is set by other player corresponding to the selected avatar. When a match-up between a character corresponding to a player of the game terminal and the selected avatar is started, an operation in which any one technique selected from among the plurality of techniques included in the avatar technique set and is actuated on the character is repeated.

Any one technique may be randomly selected based on selection probabilities that are assigned to the plurality of techniques respectively.

Stamina of the character corresponding to the player may be reduced when the actuated technique succeeds.

Each of the plurality of techniques may have a power for determining a reducing amount of the stamina. Any one technique may be randomly selected based on selection probabilities corresponding to the plurality of techniques.

Further, a selection probability of a first technique having a first power may be higher than a selection probability of a second technique having a second power higher than the first power when a remaining amount of the stamina is less than a predetermined amount, and a selection probability of the first technique may be lower than a selection probability of the second technique when the remaining amount of the stamina is greater than the predetermined amount.

Each of the plurality of techniques may have a hit distance and an action initiate time. The actuated technique may succeed if a distance between the character and the avatar is within the hit distance when the action initiate time is lapsed from a time when the selected technique is actuated.

Stamina may be reduced with lapse of time and the match-up ends when the stamina reaches zero. The plurality of techniques may correspond to a plurality of remaining amounts of the stamina, and any one technique corresponding to a remaining amount of the stamina may be selected from among the plurality of techniques.

The method may further include providing the selected avatar with an experience according to a result of the match-up.

According to yet another aspect of the social game, a computer readable recording medium having recorded thereon a program executable by a computer for performing the above-described may be provided.

In the following detailed description, only certain examples of the social game have been shown and described, simply by way of illustration. As those skilled in the art would realize, the described examples may be modified in various different ways, all without departing from the spirit or scope of the social game. Accordingly, the drawings and description are to be regarded as illustrative in nature and not restrictive. Like reference numerals designate like elements throughout the specification.

A game control method and a recording medium according to examples of the social game are described in detail with reference to the accompanying drawings.

Overall Game Control Method

A game control method according to examples of the social game is described with reference to FIG. 1 and FIG. 2.

Figure 1:
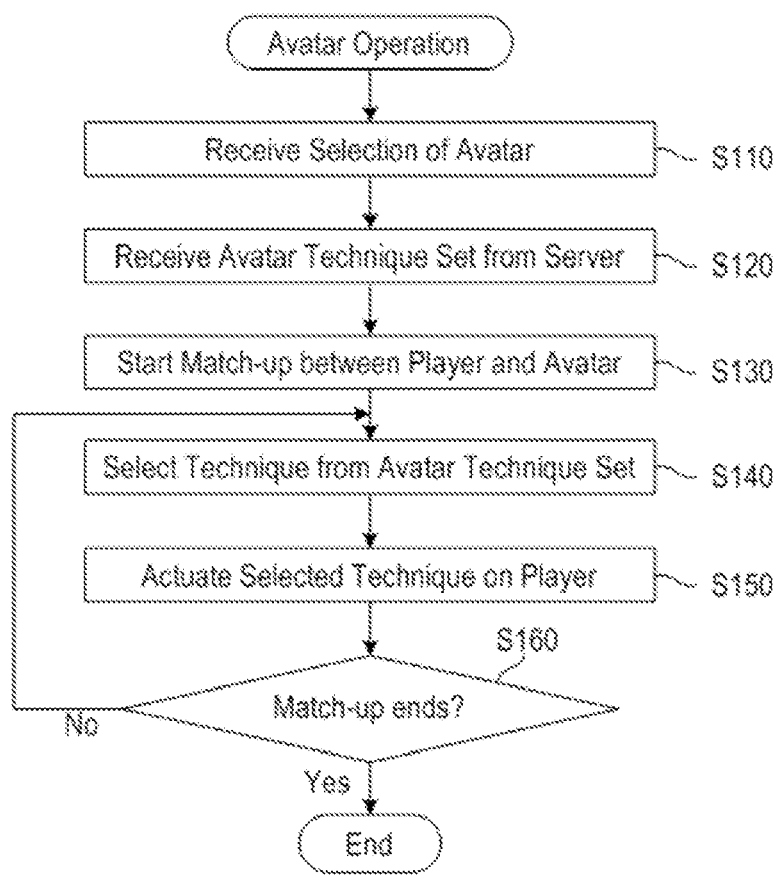
FIG. 1 is a flowchart of a game control method according to an example of a social game.
Figure 2:
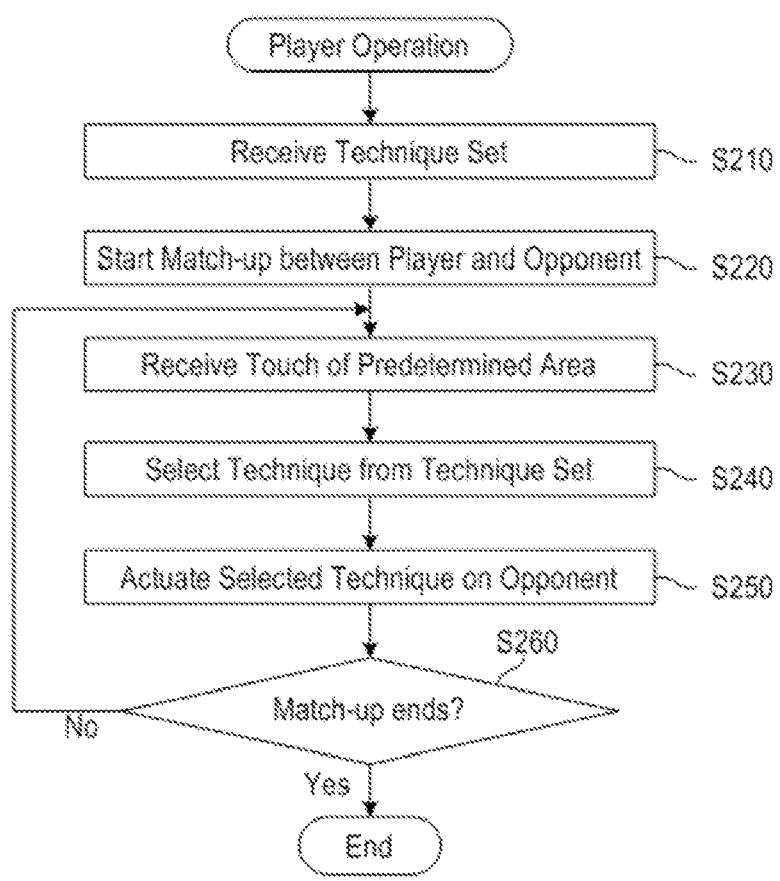
FIG. 2 is a flowchart of a game control method according to another example of the social game

FIG. 1 and FIG. 2 are flowcharts of a game control method according to examples of the social game.

Avatar Operation

A player-to-player match-up process in which a character corresponding to a player of a game terminal Fights an avatar corresponding to other player is executed in the game terminal. FIG. 1 describes an avatar operation of the player-to-player match-up process.

Referring to FIG. 1, the game terminal receives a selection of any one from among a plurality of avatars through a touch screen panel of the game terminal (S110). In this case, the plurality of avatars correspond to a plurality of other players, respectively. Next, the game terminal receives, from a game management server, an avatar technique set including a plurality of technique that is set by other player corresponding to the selected avatar (S120). Subsequently, the game terminal starts a player-to-player match-up between the character corresponding to the player of the game terminal and the selected avatar (S130).

When starting the player-to-player match-up, the game terminal selects any one technique from among the plurality of techniques included in the avatar technique set (S140), and actuates the selected technique on the character corresponding to the player (S150). Further, the game terminal repeatedly performs a process including selecting selects any one technique from among the plurality of techniques and actuating the selected technique (S140, S150), until the player-to-player match-up ends (S160). Accordingly, the avatar corresponding to the other player can Fight the character corresponding to the player if the other player set the avatar technique set including the plurality of technique to be used in the player-to-player match-up even though the other player does not control the avatar.

In some examples, when selecting any one technique from among the plurality of techniques included in the avatar technique set, the game terminal may randomly select any one technique based on selection probabilities that are assigned to the plurality of techniques respectively. Further, stamina of the character corresponding to the player may be reduced when the actuated technique of the avatar succeeds.

In some examples, the plurality of techniques may correspond to a plurality of remaining amounts of stamina. In this case, selecting any one technique including selecting any one technique corresponding to a remaining amount of the stamina from among the plurality of techniques. Further, stamina may be reduced with the lapse of time.

In some examples, the game management server may select any one technique from among the plurality of techniques included in the avatar technique set. In this case, the game management server may provide information on the selected technique to the game terminal.

Player Operation

A match-up process in which a character corresponding to a player of a game terminal Fights an opponent character controlled by a controller of the game terminal. FIG. 2 describes a player operation of the match-up process or the player-to-player match-up process.

Referring to FIG. 2, the game terminal receives a technique set including a plurality of techniques through a touch screen panel of the game terminal (S210). Next, the game terminal starts a match-up between the character corresponding to the player of the game terminal and an opponent character (S220). The opponent character may be a character controlled by a controller of the game terminal or an avatar of other player.

When starting the player-to-player match-up, the game terminal receives a touch on a predetermined area of the touch screen panel (S230). The game terminal selects any one technique from among the plurality of techniques included in the technique set in response to the touch (S240), and actuates the selected technique on the opponent character (S250). Further, the game terminal repeatedly performs a process including receiving a touch on the predetermined area of the touch screen panel, selecting any one technique from among the plurality of techniques in response to the touch, and actuating the selected technique (S230, S240, S250), until the match-up ends (S260). Accordingly, the player can Fight the opponent character by using various techniques only by touching the predetermined area, for example an action button, of the touch screen panel.

In some examples, the plurality of techniques may be arranged in sequence in the technique set. The plurality of techniques may be selected in sequence when any one technique is selected from among the plurality of techniques.

Overall ConFiguration of Game System

A game system according to examples of the social game is described in detail with reference to FIG. 3 and FIG. 4.

Figure 3:
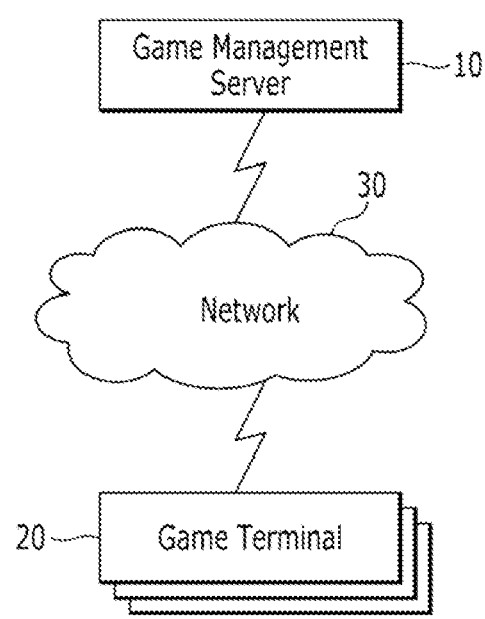
FIG. 3 is a schematic diagram showing a game system according to an example of the social game.
Figure 4:
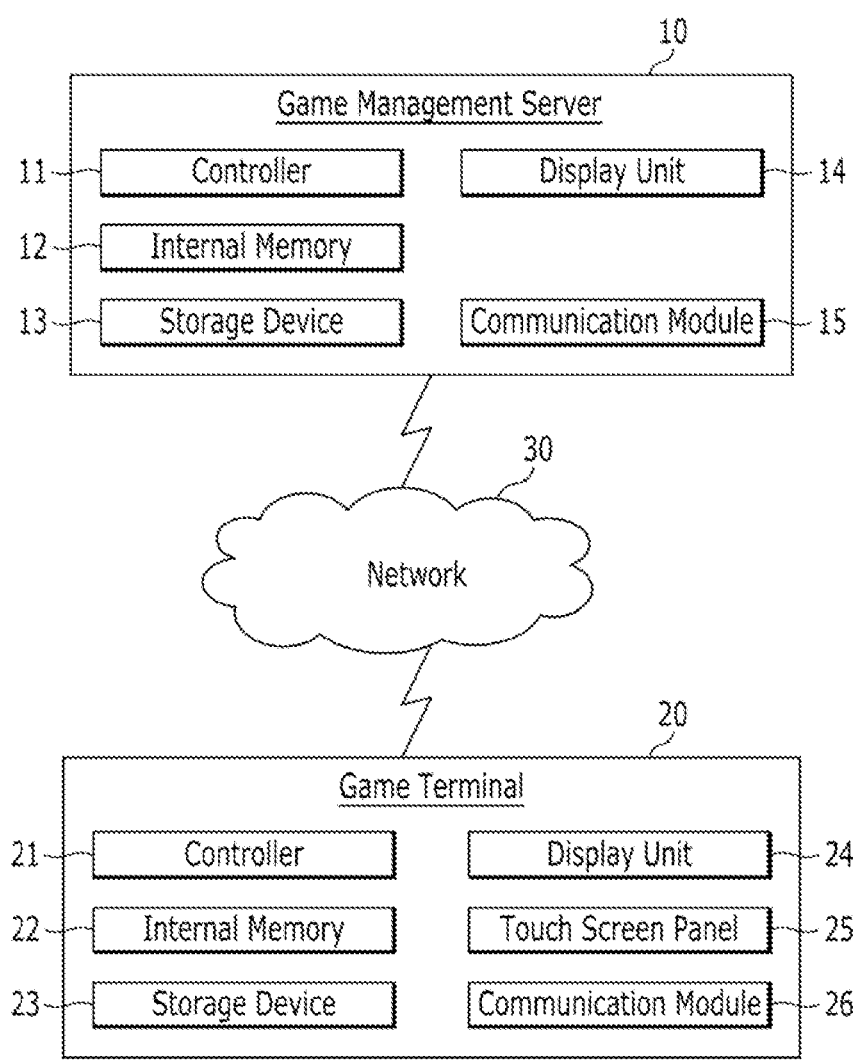
FIG. 4 is a schematic diagram showing a game management server and a game terminal according to an example of the social game.

FIG. 3 is a schematic diagram showing a game system according to an example of the social game, and FIG. 4 is a schematic diagram showing a game management server and a game terminal according to an example of the social game.

Referring to FIG. 3, a game system includes a game management server 10 and a plurality of game terminals 20 connected to the game management server 10 via a network 30.

The game management server 10 manages games which are executed on the plurality of game terminals 20 and information on players of the game terminals 20.

The game terminal 20 executes a game, for example a Fighting game, and may be a terminal having a touch panel, for example a smart phone or a tablet. The game terminal 20 can download and install a game application, and execute the game application to operate a game. The game application may be provided through an application store that is a type of digital distribution platform for application software.

Referring to FIG. 4, a game terminal 20 includes a controller 21, an internal memory 22, a storage device 23, a display unit 24, a touch screen panel 25, and a communication module 26. The internal memory 22 may include a read only memory (ROM) and a random access memory (RAM).

The controller 21 may be a central processing unit (CPU). The controller 21 loads applications including a game application stored in the storage device 23 into the internal memory 22, particularly the RAM, and executes the loaded applications. Further, the controller 21 controls the display unit 24 to display images from the loaded application, and controls the communication module 26 to communicate a game management server 10. The internal memory 22, particularly the ROM, stores a program to be executed by the controller 21 such as BIOS, along with another data to be maintained permanently. The internal memory 22, particularly the RAM stores data and programs or applications which are used during the operation of the controller 21, and further stores data such as tables used for operating the game application. The communication module 26 facilitates data communication of the controller 21 with an external controller of, for example, the game management server 10 through a communication channel.

The display unit 24 displays images that output from the executed applications. The touch screen panel 25 operates an input device, and detects a position touched by a player to provide the controller 21 with a position sense signal corresponding to the detected position. The controller 21 receives the position sense signal to detect input. The display unit 24 and the touch screen panel 25 may be provided as a display device.

The game management server 10 includes a controller 11, an internal memory 12, a storage device 13, a display unit 14, and a communication module 15. The internal memory 12 may include a ROM and a RAM.

The controller 11 may be a CPU. The controller 11 loads programs including a game management program stored in the storage device 13 into the internal memory 12, particularly the RAM, and executes the loaded game management program. Further, the controller 11 controls the display unit 14 to display images from the loaded program, and controls the communication module 15 to communicate a plurality of game terminals 20. The internal memory 12, particularly the ROM, stores a program to be executed by the controller 11 such as BIOS, along with another data to be maintained permanently. The internal memory 12, particularly the RAM stores data and programs which are used during the operation of the controller 11, and further stores data used for operating the game management program and data used for authenticating the game terminal 20. The communication module 15 facilitates data communication of the controller 11 with the controller 21 of each of the plurality of game terminals 10 through a communication channel.

The storage unit 13 stores the game management program and other programs for authenticating and managing the games of the game terminals 20. Further, the storage unit 13 stores information on each of the game terminals 20, information on each of players using the game terminals 20, and information associated with the game executed in each of the game terminals 20. The storage unit 13 may operate as a database. The display unit 14 displays images that output from the executed programs.

Gaming Operations

Hereinafter, gaming operations according to examples of the social game are described in detail with reference to FIG. 5 to FIG. 34C.

Example of Access Process

Figure 5:
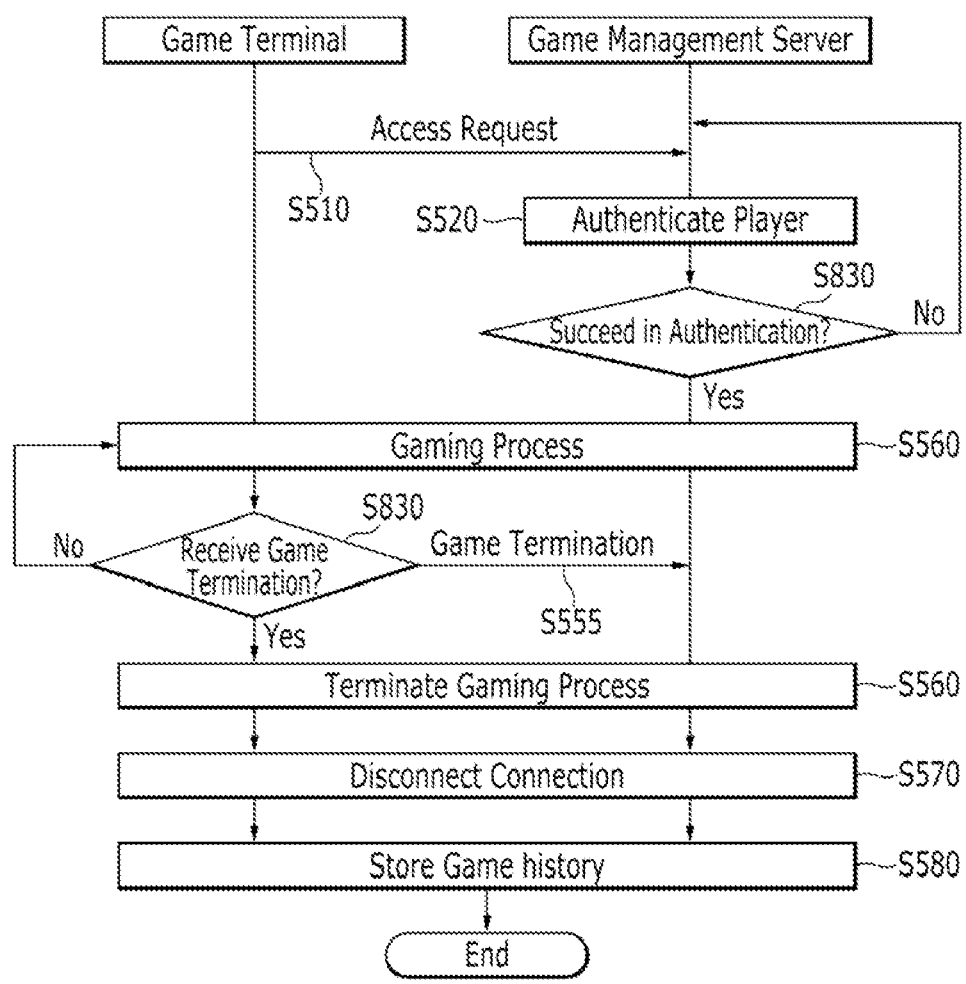
FIG. 5 is a flowchart of an access process according to an example of the social game.

FIG. 5 is a flowchart of an access process according to an example of the social game.

Referring to FIG. 5, a game terminal executes a game application and accesses a game management server (S510). In this case, the game terminal may receive identification information of a player through an input device, and transmit the identification information to the game management server to request an access. The input device may include a touch screen, and the player may input the identification information on the touch screen. The game management server, upon receiving the access request from the game terminal, authenticates the player (S520). When succeeding in authenticating the player (S530: Yes), the game terminal and the game management server performs a gaming process (S540).

When the game terminal receives game termination input from the player through the input device (S550: Yes), the game terminal transmits a game termination signal to the game management server (S555). Then, the game terminal and the game management server terminates the gaming process (S560). The input device may include a touch screen, and the player may touch an area for indicating a game termination, a logout, or a logoff on the touch screen. The game terminal and the game management server disconnect the connection between the game terminal and the game management server (S570), and store a game history of the player (S580).

Example of Gaming Process for Match-Up

Figure 6:
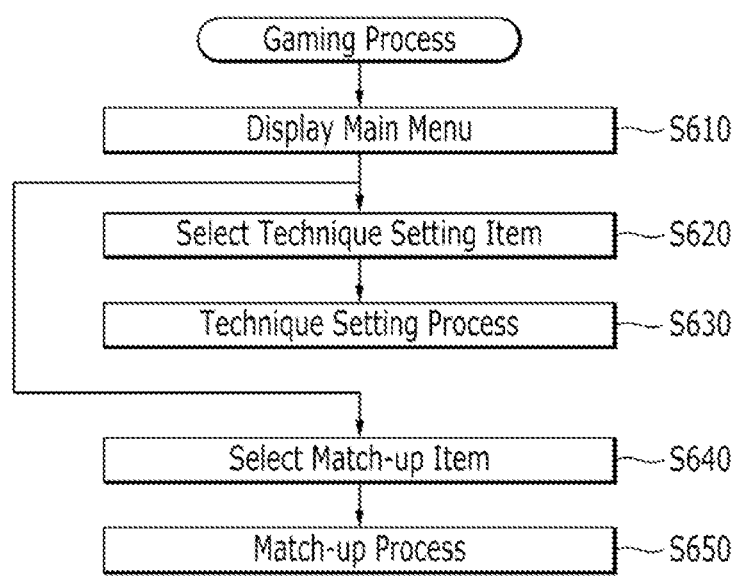
FIG. 6 is a flowchart of a gaming process according to an example of the social game.
Figure 7:
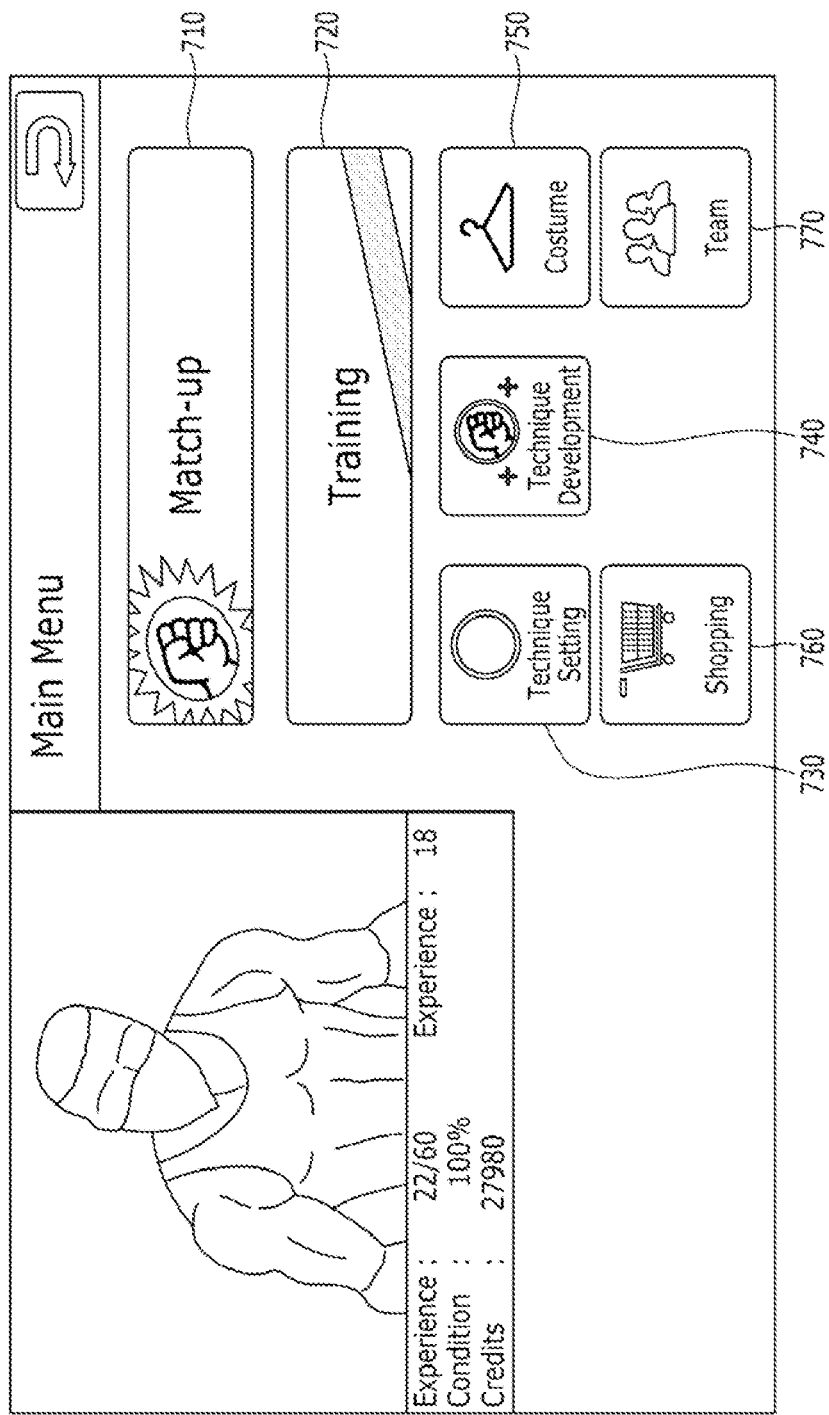
FIG. 7 shows an example of a main menu displayed when a gaming process shown in FIG. 6 is executed.

FIG. 6 is a flowchart of a gaming process according to an example of the social game, and FIG. 7 shows an example of a main menu displayed when a gaming process of FIG. 6 is executed.

Referring to FIG. 6, when the gaming process is executed, a controller of the game terminal displays a main menu on a display device of the game terminal (S610). As shown in FIG. 7, the main menu includes a plurality of items to be selected by the player. The plurality of items includes a match-up item 710 for Fighting a character controlled by the controller, a training item 720 for training character of the player, and a technique setting item 730 for setting a sequence of techniques. The training item 720 provides a screen for training the character of the player, and the player can increase his or her experience through training.

The plurality of items may further a technique development item 740, a costume item 750, a shopping item 760, and a team item 770. The technique development item 740 may provide a screen for allowing the player to develop a technique, and the costume item 750 may provide a screen for allowing the player to change a costume. The shopping item 760 may provide a screen for allowing the player to buy credits or techniques, and the team item 770 may provide a screen for allowing the player to interact with members of the same team.

When the player selects the technique setting item 730 using an input device (S620), the controller executes a technique setting process (S630). The input device may include a touch screen, and the player may touch a desired item on the touch screen to select the time.

Example of Technique Setting Process

Figure 8:
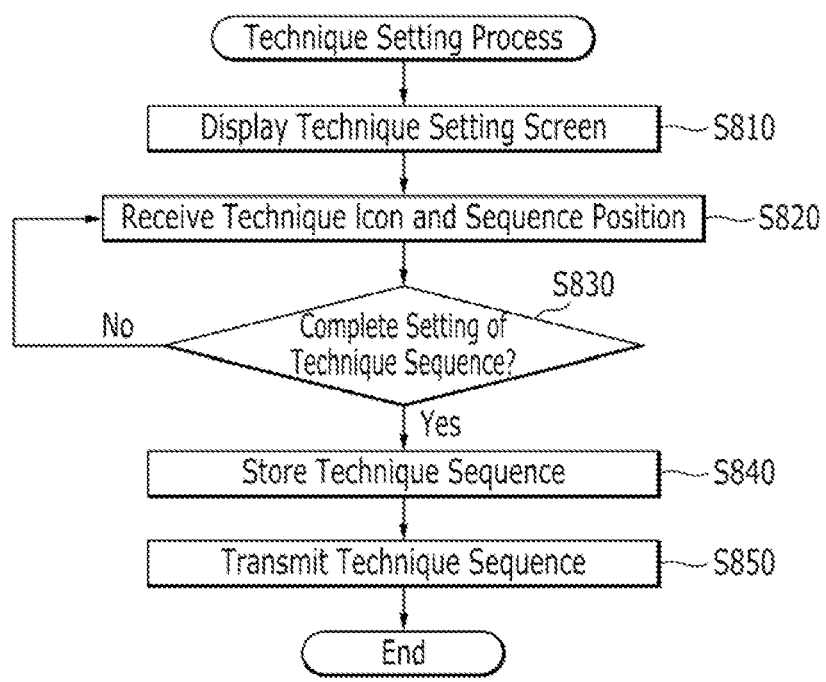
FIG. 8 is a flowchart of a technique setting process of a gaming process according to an example of the social game.
Figure 9:
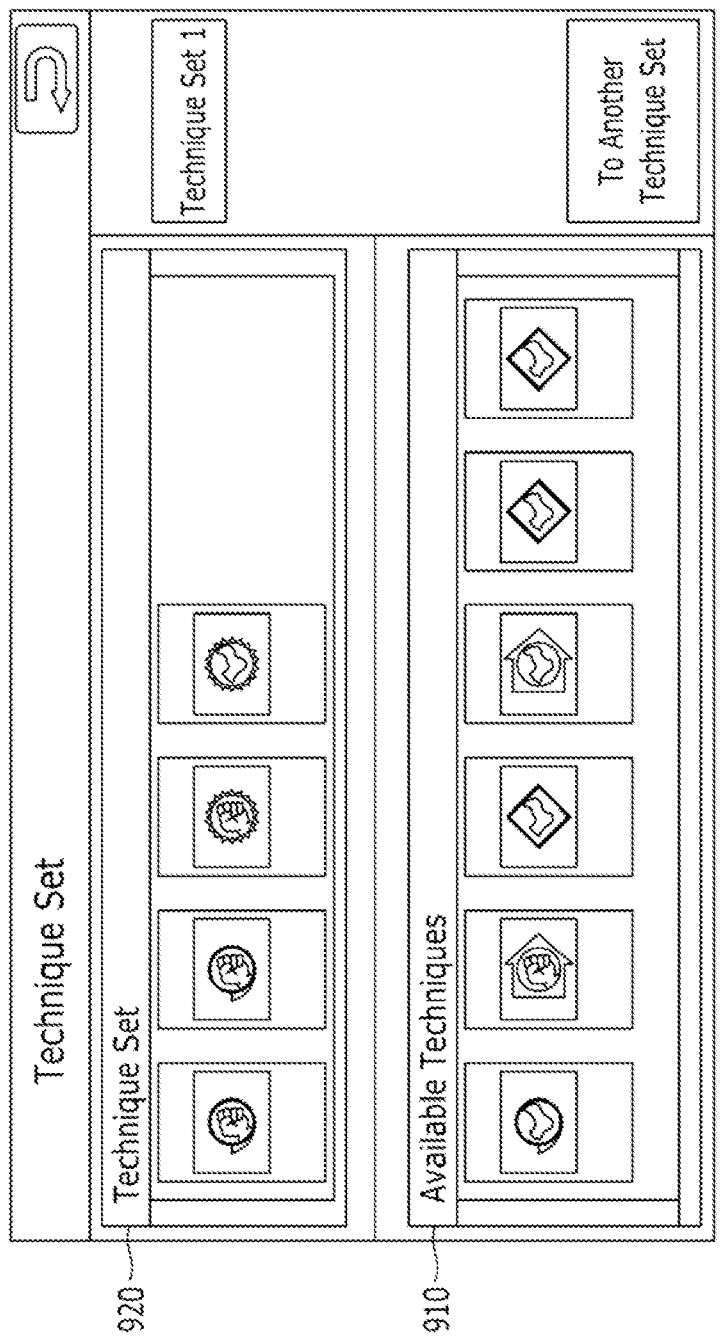
FIG. 9 shows an example of a technique setting screen displayed when a technique setting process shown in FIG. 8 is executed.
Figure 10:
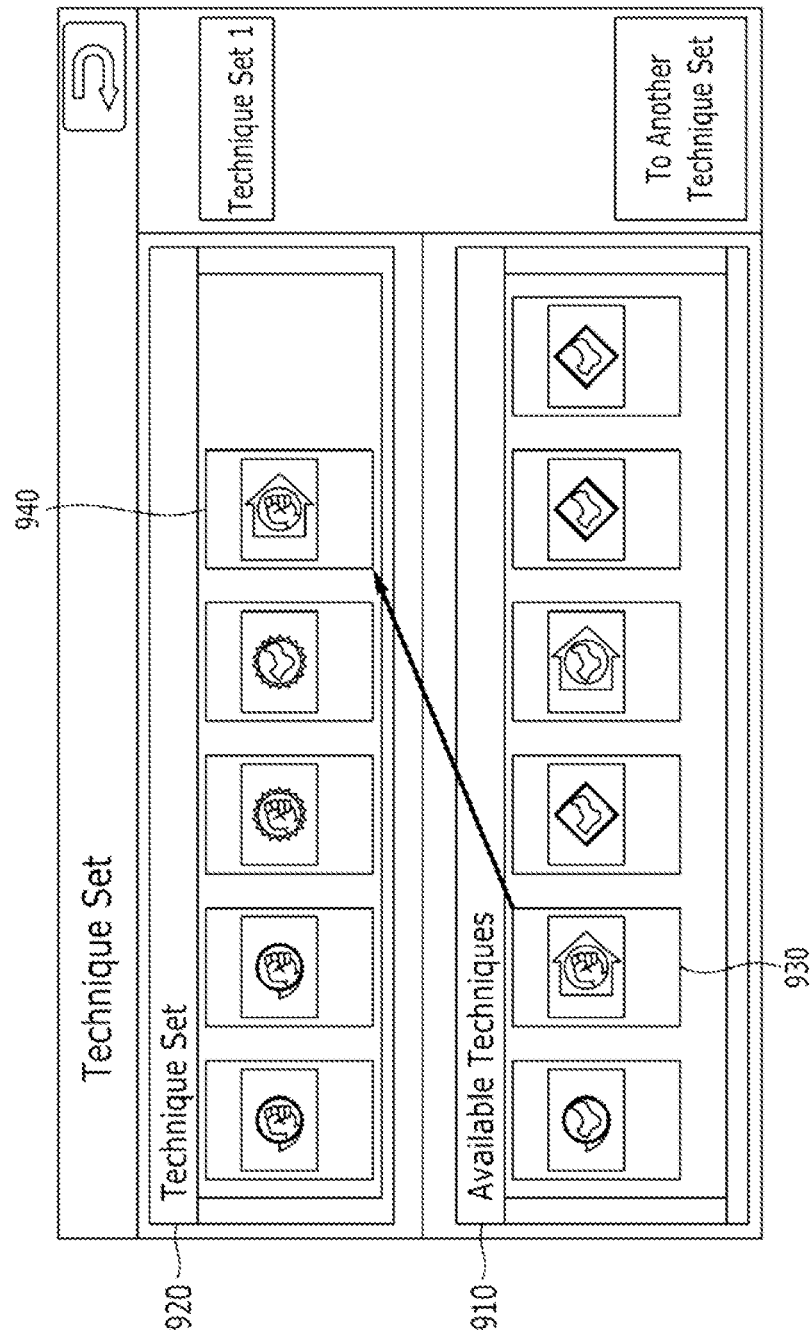
FIG. 10 shows an example of a technique setting operation in a technique setting screen of FIG. 9.

FIG. 8 is a flowchart of a technique setting process of a gaming process according to an example of the social game, FIG. 9 shows an example of a technique setting screen displayed when a technique setting process of FIG. 8 is executed, and FIG. 10 shows a an example of a technique setting operation in a technique setting screen of FIG. 9.

Referring to FIG. 8, in the technique setting process, the controller displays a technique setting screen on the display device (S810). Referring to FIG. 9, the technique setting screen includes an available technique area 910 and a technique set area 920. The available technique area 910 includes a plurality of technique icons corresponding to a plurality of techniques that can be used by the player. The technique set area 910 includes a sequence of technique icons that are selected from the available technique area 910 by the player. For example, the plurality of techniques may include attacking techniques, a blocking technique and/or a throwing technique. The attacking techniques may include various first attacks, elbow attacks, body attacks, shoulder attacks, grappling attacks, leg attacks, and/or head attacks.

Next, the controller receives a selection of a technique icon to be set and a sequence position of the selected technique icon in the technique set area 920 by the input device (S820). As shown in FIG. 10, the player may touch and drag the technique icon 930 to be selected from the available technique area 910, and drop the selected technique icon 930 on the sequence position 940 to be selected in the technique set area 920. The sequence position may be the beginning of the technique sequence, the end of the technique sequence, or a position between two adjacent techniques in the technique sequence. Next, the controller determines whether the setting of the technique sequence is completed (S830). When the setting of the technique sequence is not completed (S830: No), the controller receives other technique icon and a sequence position of the other technique icon by the input device (S820). When the setting of the technique sequence is completed (S830: Yes), the controller stores the technique sequence that has been set (S840). The setting of technique sequence may be completed by touch of a return button on the technique set screen. Further, the controller may transmit information on the technique sequence to the game management server (S850). The game management server may store information on the technique sequence for the player. As a result, the technique sequence includes a plurality of techniques that are sequentially arranged.

In a certain example, plural types of technique sequences may be set. The player may select any one of the plural types of technique sequences when performing a match-up.

Example of Match-Up Process

Figure 11:
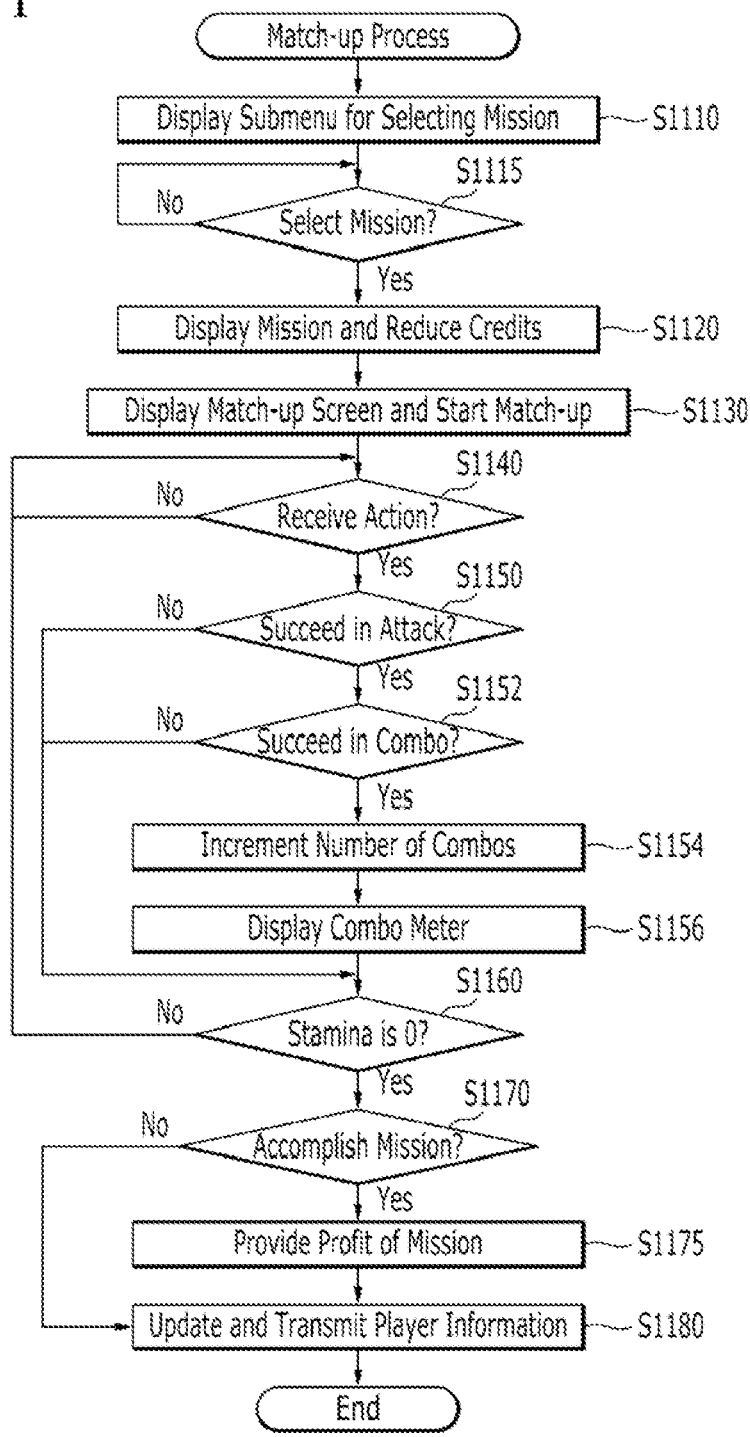
FIG. 11 is a flowchart of a match-up process of a gaming process according to an example of the social game.
Figure 12:
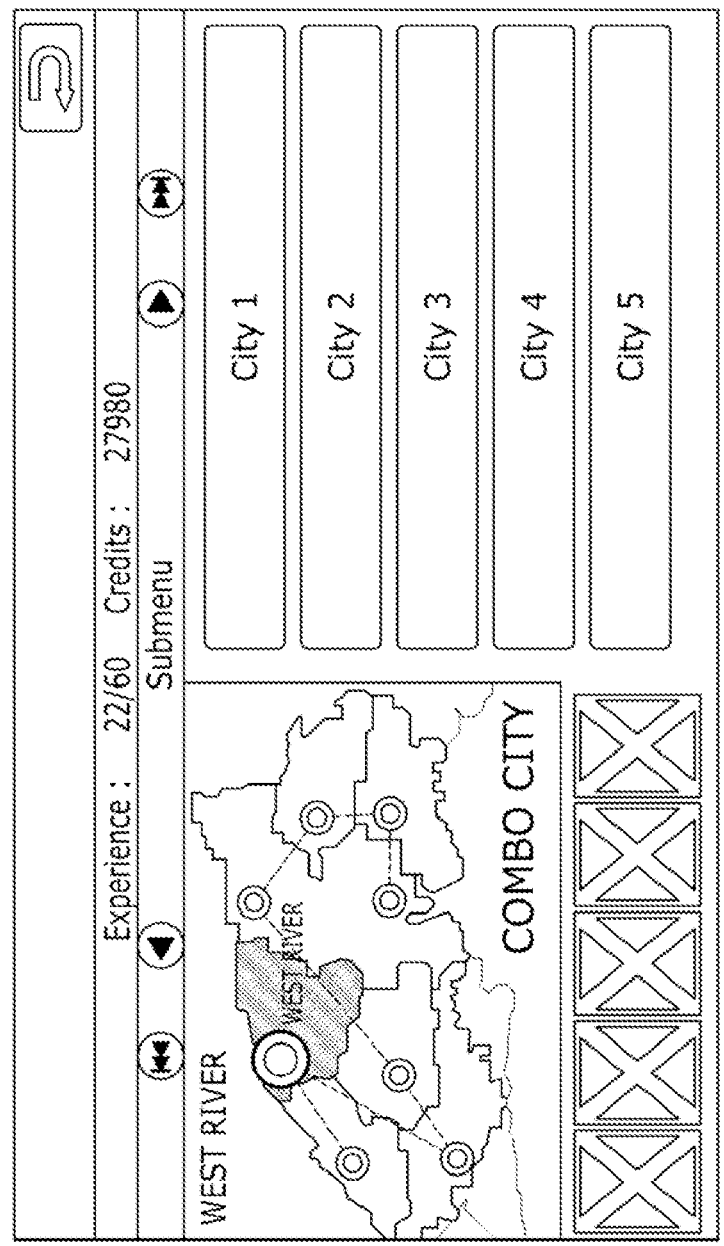
FIG. 12 shows an example of a submenu displayed when a match-up process shown in FIG. 11 is executed.
Figure 13:
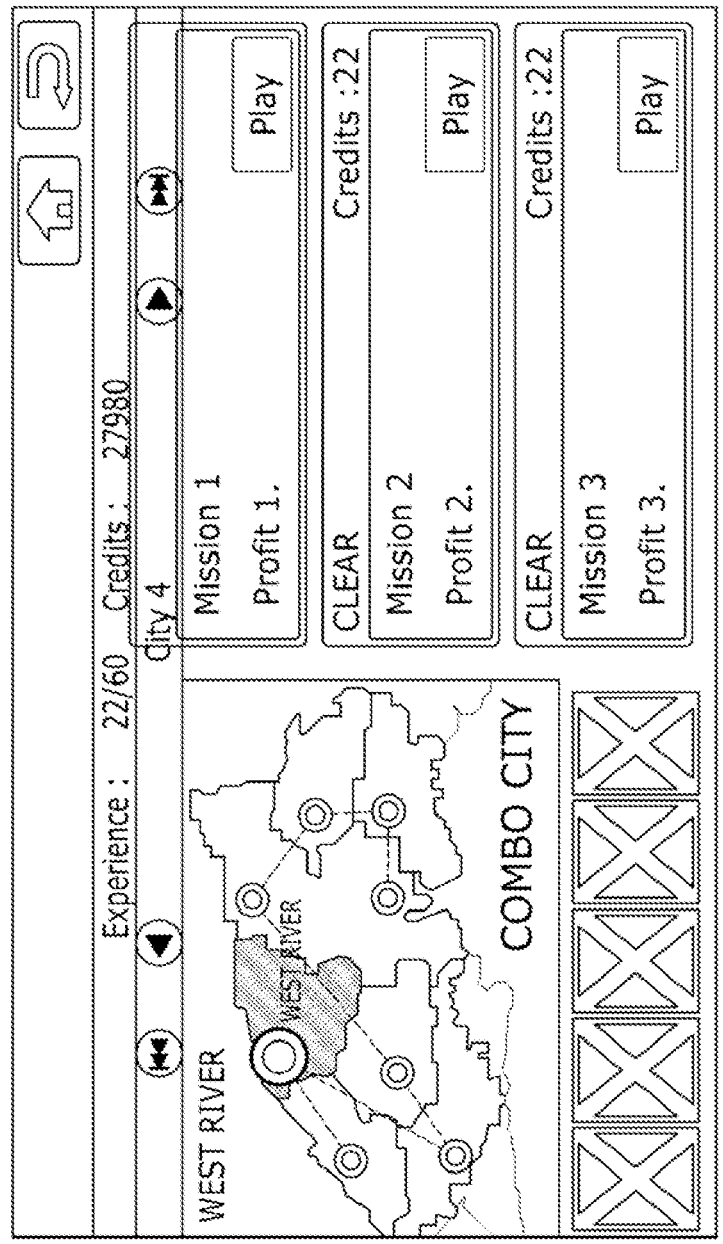
FIG. 13 shows an example of a sub-item in a submenu shown in FIG. 12.
Figure 14:
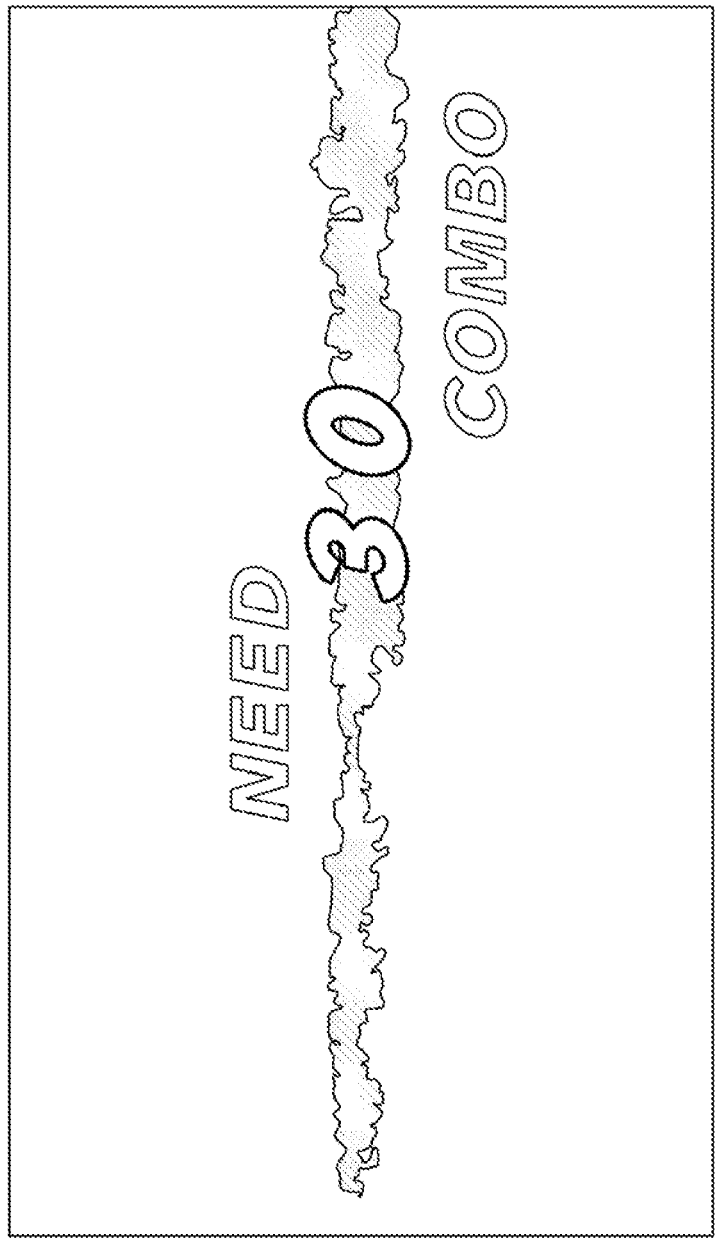
FIG. 14 shows an example of a mission used in a game control method according to an example of the social game.
Figure 15:
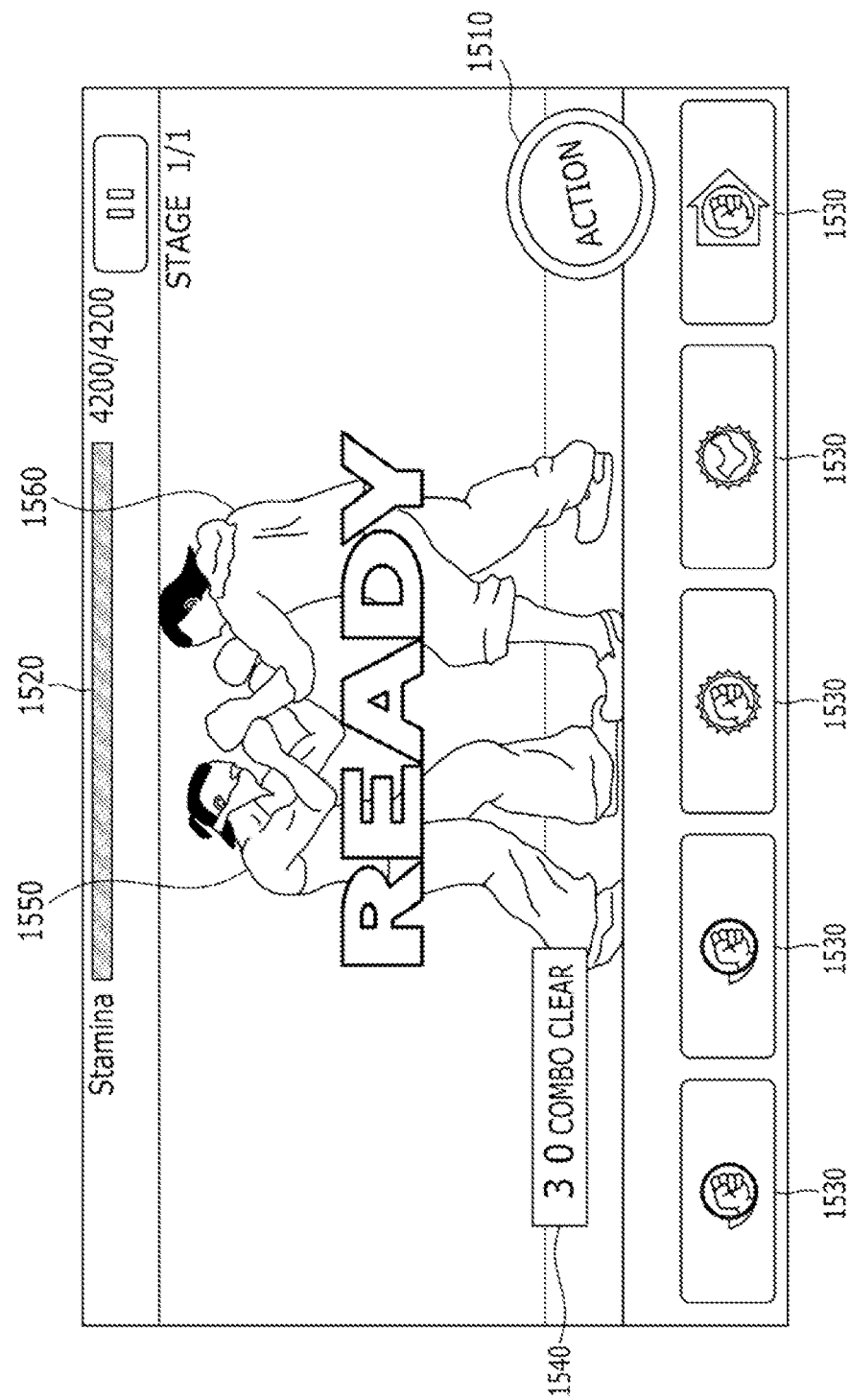
FIG. 15 shows an example of a match-up screen.
Figure 16:
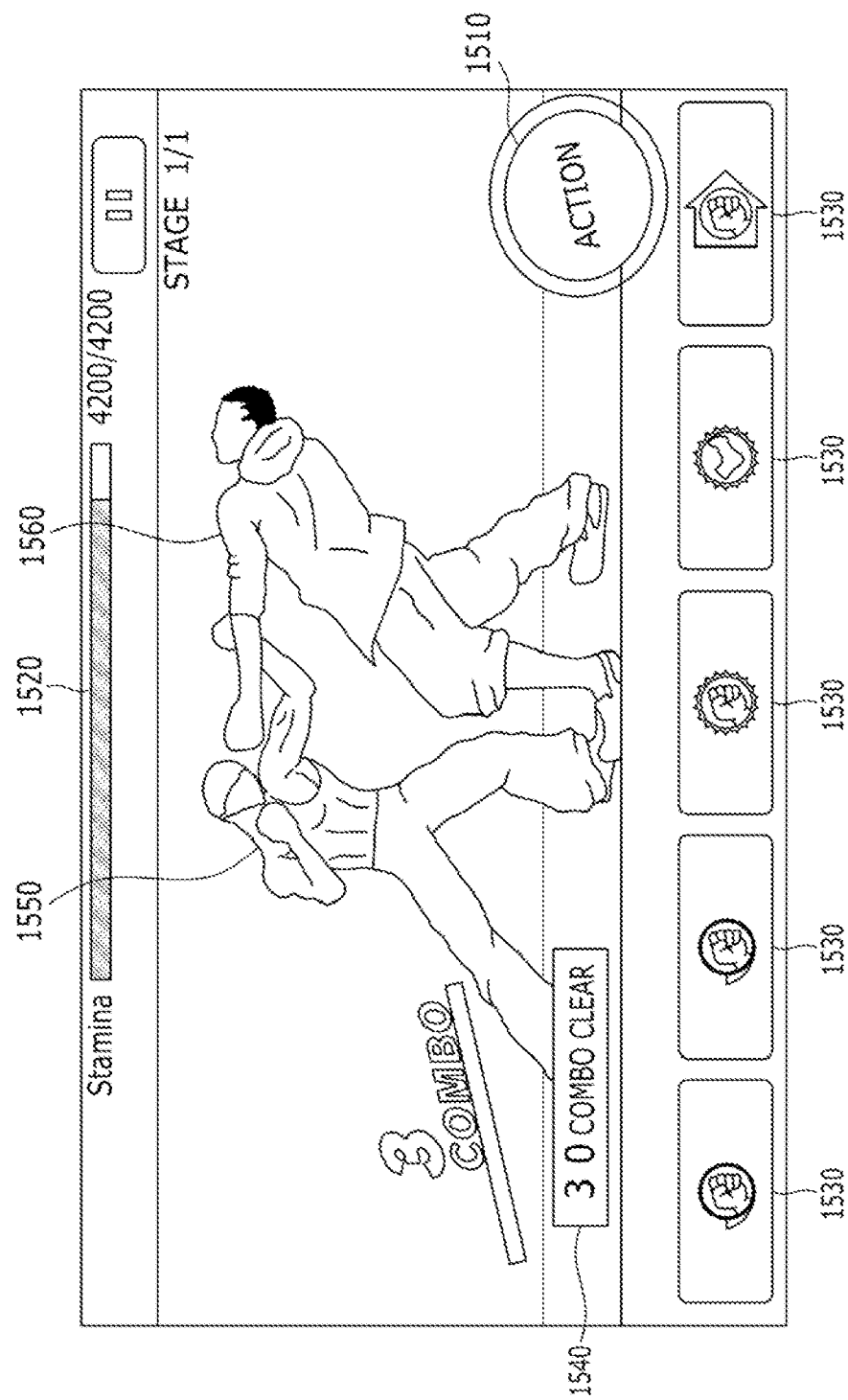
FIG. 16 shows an example of a player operation in a match-up screen shown in FIG. 15.

FIG. 11 is a flowchart of a match-up process of a gaming process according to an example of the social game, FIG. 12 shows an example of a submenu displayed when a match-up process shown in FIG. 11 is executed, FIG. 13 shows an example of a sub-item in a submenu shown in FIG. 12, FIG. 14 shows an example of a mission, FIG. 15 shows an example of a match-up screen, and FIG. 16 shows an example of a player operation in a match-up screen shown in FIG. 15.

Referring to FIG. 6 again, when the match-up item 710 is selected by the input device (S640), the controller executes a match-up process (S650). Referring to FIG. 11, in the match-up process, the controller displays a submenu for selecting an opponent character on the display device (S1110). As shown in FIG. 12, the submenu may list a plurality of sub-items that correspond to a plurality of countries or cities, respectively. As shown in FIG. 13, the sub-item may include at least one mission item. The mission item may include a credit value required to perform a mission provided in the mission item and a profit provided when the mission is cleared. The profit may include a credit value provided in the mission, an increase of a player experience, and/or a technique provided in the mission. When a certain mission item is selected, the player Fights an opponent character provided in the mission item.

When the mission item is selected by the input device (S1115), the controller displays a mission of the mission item on the display device as shown in FIG. 14 and reduces the credits of the user by the credit value required in the mission item (S1120). In this case, the controller may transmit the reduced credits to the game management server, and the game management server may update the credits of the user according to the reduced credits. The mission may include the number of attack combinations (hereinafter referred to as "combos") that should be accomplished. The combos are a term that designates a set of actions performed in sequence, with timing limitations, that yield a decrease of stamina of the opponent character. Next, the controller displays a match-up screen on the display device as shown in FIG. 15 and starts the match-up (S1130). The match-up screen includes an action button 1510 and a stamina meter 1520. The stamina meter 1520 indicates a remaining amount of stamina. The match-up screen may further include a plurality of technique buttons 1530 corresponding to a plurality of techniques. The match-up screen may further include the number of combos to be accomplished (1540). Further, the match-up screen displays the character 1550 corresponding to the player and the opponent character 1560 controlled by the controller.

Next, the controller receives an action from the player by using the input device (S1140). The player may input the action by touching the action button 1510 on the display device as shown in FIG. 16. Each time the action button 1510 is touched, the plurality of techniques are sequentially performed in the order of the sequence of techniques set in the technique set area 920. For example, it is assumed that the technique sequence is a sequence of a straight, a body jab, an uppercut, a left middle kick, and an elbow. The first touch of the action button 1510 allows a character of the user to use the right high kick on the opponent character, the second touch of the action button 1510 allows the character to use the body jab on the opponent character, the third touch of the action button 1510 allows the character to use the uppercut on the opponent character, the fourth touch of the action button 1510 allows the character to use the left middle kick on the opponent character, and the fifth touch of the action button 1510 allows the character to use the elbow on the opponent character. If all of the techniques of the sequences, the technique is performed again from the beginning of the sequence. That is, the sixth touch of the action button 1510 allows the character to use the right high kick.

Instead of touching the action button 1510, the use may directly touch the technique button 1530 corresponding to a desired technique.

Next, the controller determines whether the attack according to the technique used by the player succeeds (S1150). In this case, an action of the opponent character is performed by the controller according to a predetermined rule. That is, the opponent character may block the attack from the user, may counter-attack the user on the attack from the user, or may attack the user. When the attack from the user succeeds (S1150: Yes), the controller determines whether the successful attack is continuous to a previous successful attack (S1152). When the successful attack is continuous (S1152: Yes), the controller increments the number of combos by one (S1154). The controller displays on the display device a combo meter 1540 representing the number of combos that are succeeded (S1156). When the continuous attack fails (S1152: No), the controller does not increment the number of combos.

Next, the controller determines whether the remaining amount of the stamina meter 520 reaches zero (S1160). The stamina of the stamina meter 1520 may decrease with the lapse of time. Alternatively, the stamina may decrease each time the attack from the player succeeds. When the stamina of the stamina meter 1520 remains (S1160: No), the controller receives the action from the player again (S1140). When the stamina of the stamina meter 1520 reaches zero (S1160: Yes), the controller determines whether the mission is accomplished (S1170). That is, the controller determines whether the number of combos that are succeeded is equal to or greater than the number of combos required in the mission (S1170). When the mission is accomplished, that is, the number of combos that are succeeded is equal to or greater than the number of combos required in the mission (S1170: Yes), the controller provides the player with the profit of the mission (S1175). According to the profit, the controller updates information of the player (S1180), and ends the match-up. The information may include the player experience, the credits of the player, and/or the available technique of the player. That is, according to the profit, the player experience and/or the credits of the player may be increased, and/or the player may obtain a new technique provided in the mission. In this case, the controller may transmit the updated information to the game management server (S1180), and the game management server may update the information of the player according to the updated information. When the mission is not accomplished (S1170: No), the controller ends the match-up without providing the profit and update the information of the player. Even though the mission is not accomplished, the player experience may be increased. When the player experience increases to a predetermined value, a level of the player may be incremented by one.

Example of Gaming Process for Player-to-Player Match-Up

Figure 17:
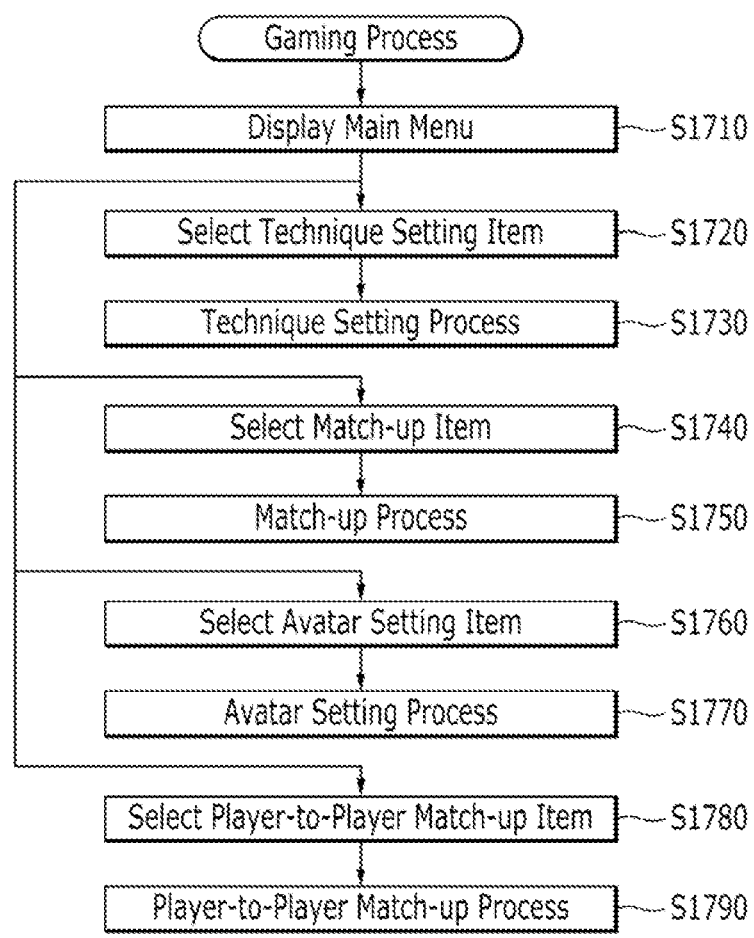
FIG. 17 is a flowchart of a gaming process according to another example of the social game.

FIG. 17 is a flowchart of a gaming process according to another example of the social game.

Referring to FIG. 17, when the gaming process is executed, a controller of the game terminal displays a main menu on a display device of the game terminal (S1710). The main menu includes a plurality of items to be selected by the user. The plurality of items include a player-to-player match-up item for Fighting a character of the other player as well as a technique setting item and a match-up item. That is, a game application in an example shown in FIG. 17 supports an option for Fighting the other player. Further, the game application provides an avatar corresponding to the player for the user match-up. Accordingly, the plurality of items further include an avatar setting item. The plurality of items may further include a training item for training character of the user. Operations when the technique setting item and the match-up item are selected may be substantially the same as the operations (S620, S630, S640, and S650) described with reference FIG. 6 to FIG. 16.

When the player selects the avatar setting item using an input device (S1760), the controller executes an avatar setting process (S1770). An avatar corresponds to the player, and the avatar can be identified by an identifier (ID) of the player.

Example of Avatar Setting Process

Figure 18:
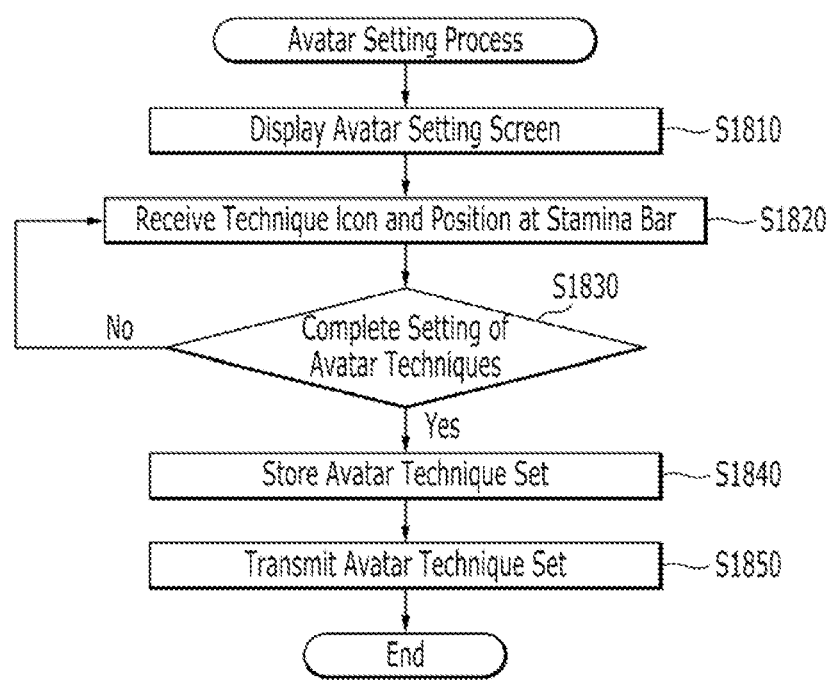
FIG. 18 is a flowchart of an avatar setting process of a gaming process according to another example of the social game.
Figure 19:
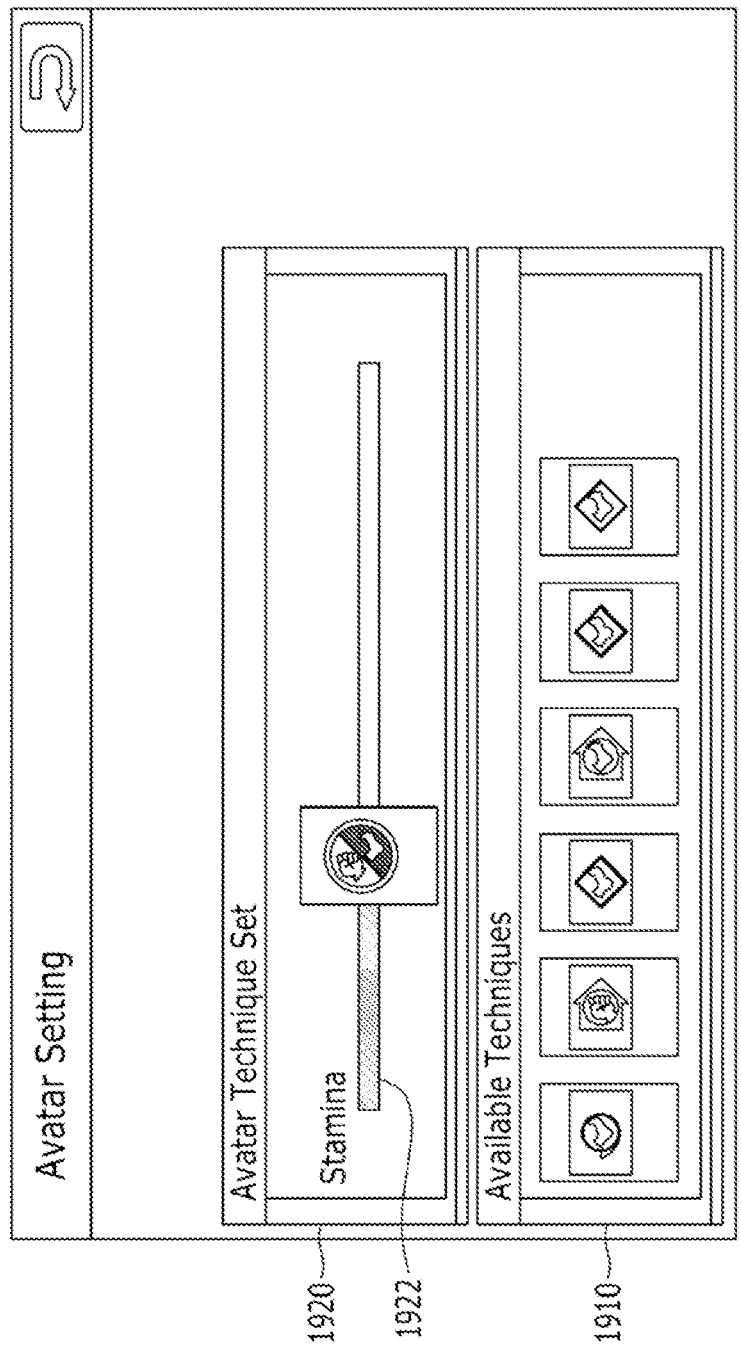
FIG. 19 shows an example of an avatar setting screen displayed when an avatar setting process shown in FIG. 18 is executed.
Figure 20:
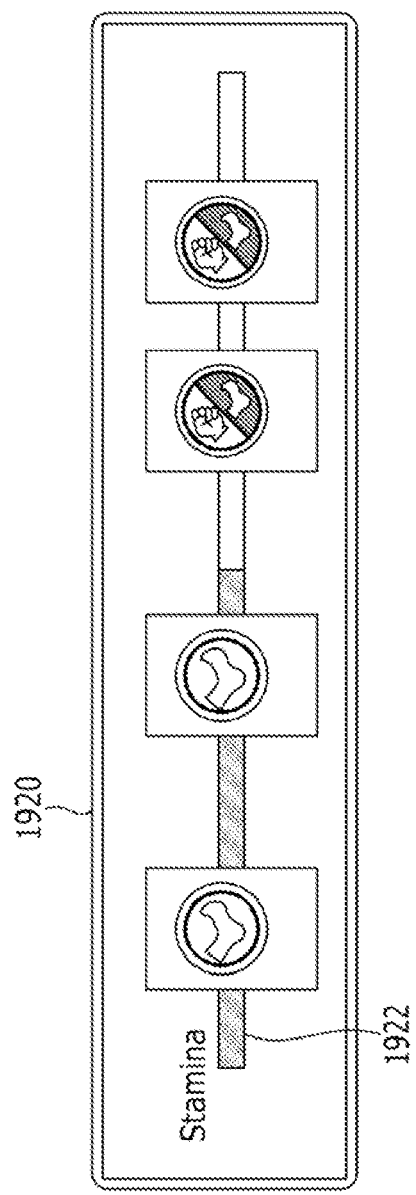
FIG. 20 shows an example of an avatar setting operation in an avatar setting screen shown in FIG. 19.

FIG. 18 is a flowchart of an avatar setting process of a gaming process according to another example of the social game, FIG. 19 shows an example of an avatar setting screen displayed when a avatar setting process shown in FIG. 18 is executed, and FIG. 20 shows an example of an avatar setting operation in an avatar setting screen shown in FIG. 19.

Referring to FIG. 18, in the avatar setting process, the controller displays an avatar set screen on the display device (S1810). Referring to FIG. 19, the avatar setting screen includes an available technique area 1910 and a technique set area 1920. The available technique area 1910 includes a plurality of technique icons corresponding to a plurality of techniques that can be used by the player. The technique set area 1920 includes a stamina bar 1922 indicating a gauge of stamina.

Next, the controller receives a technique icon selected by the player and a position of the selected technique icon at the stamina bar 1922 by the input device (S1820). As shown in FIG. 19 and FIG. 20, the user may touch and drag the technique icon from the available technique area 1910, and drop the dragged technique icon on a certain position of the stamina bar 1922. In this case, when the stamina of the opponent player is reduced to reach a certain position of the stamina bar, a technique corresponding to the technique icon dropped on the certain position is actuated. That is, a technique corresponding to remaining amount of the stamina is actuated according to the remaining amount of the stamina.

Next, the controller determines whether setting techniques of an avatar is completed (S1830). When setting the techniques of the avatar is not completed (S1830: No), the controller receives other technique icon and a position of the other technique icon by the input device (S1820). When setting of the avatar technique set is completed (S1830: Yes), the controller stores the avatar technique set that has been set (S1840). Setting of the avatar technique set may be completed by touch of a return button on the avatar set screen. Further, the controller may transmit information on the avatar technique set to the game management server (S1850). The game management server may store information on the avatar technique set for the player. As a result, the avatar technique set includes a plurality of techniques that are located at selected positions at the stamina bar, respectively. Accordingly, the avatar can actuate the predetermined technique in accordance with remaining amount of the stamina of the opponent player, thereby Fighting a character of the opponent player.

On the other hand, the opponent player can Fight the avatar of the player during a plurality of stages. In a certain example, the player may set the techniques of the avatar for each of a plurality of stages or some of the plurality of stages. This example is described with reference to FIG. 21 and FIG. 22.

Figure 21:
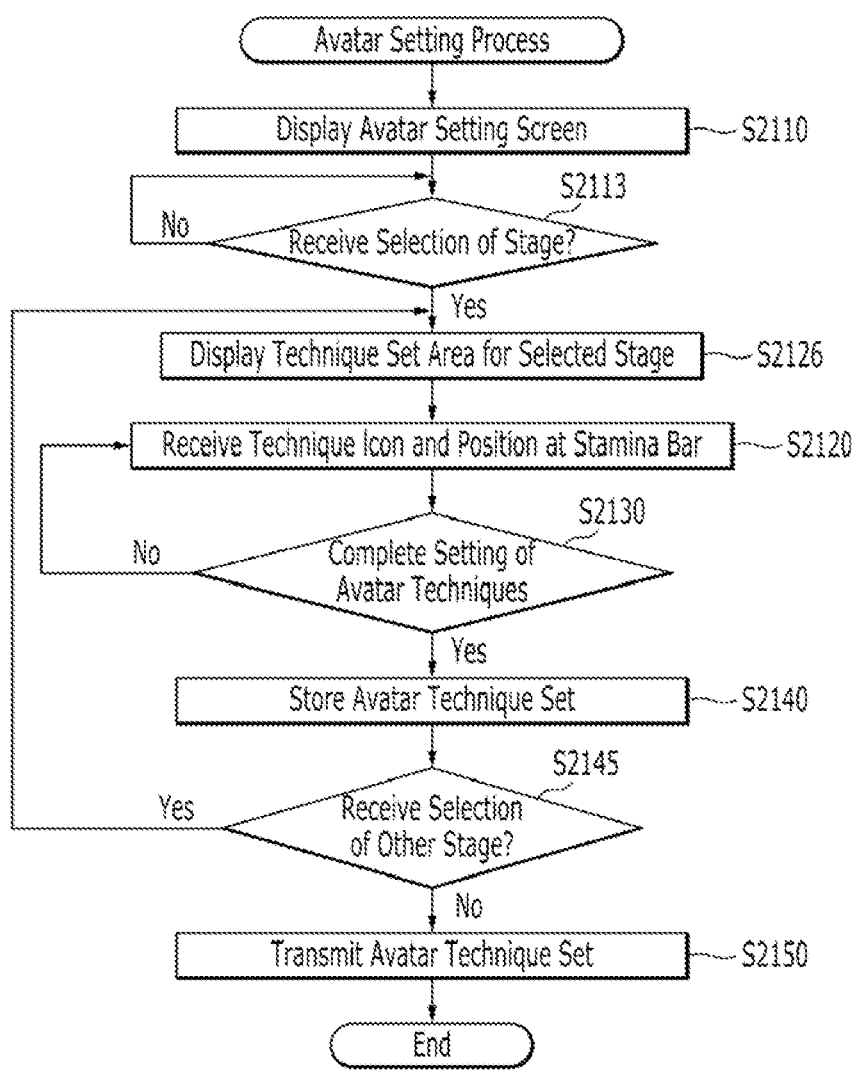
FIG. 21 is a flowchart of an avatar setting process of a gaming process according to yet another example of the social game.
Figure 22:
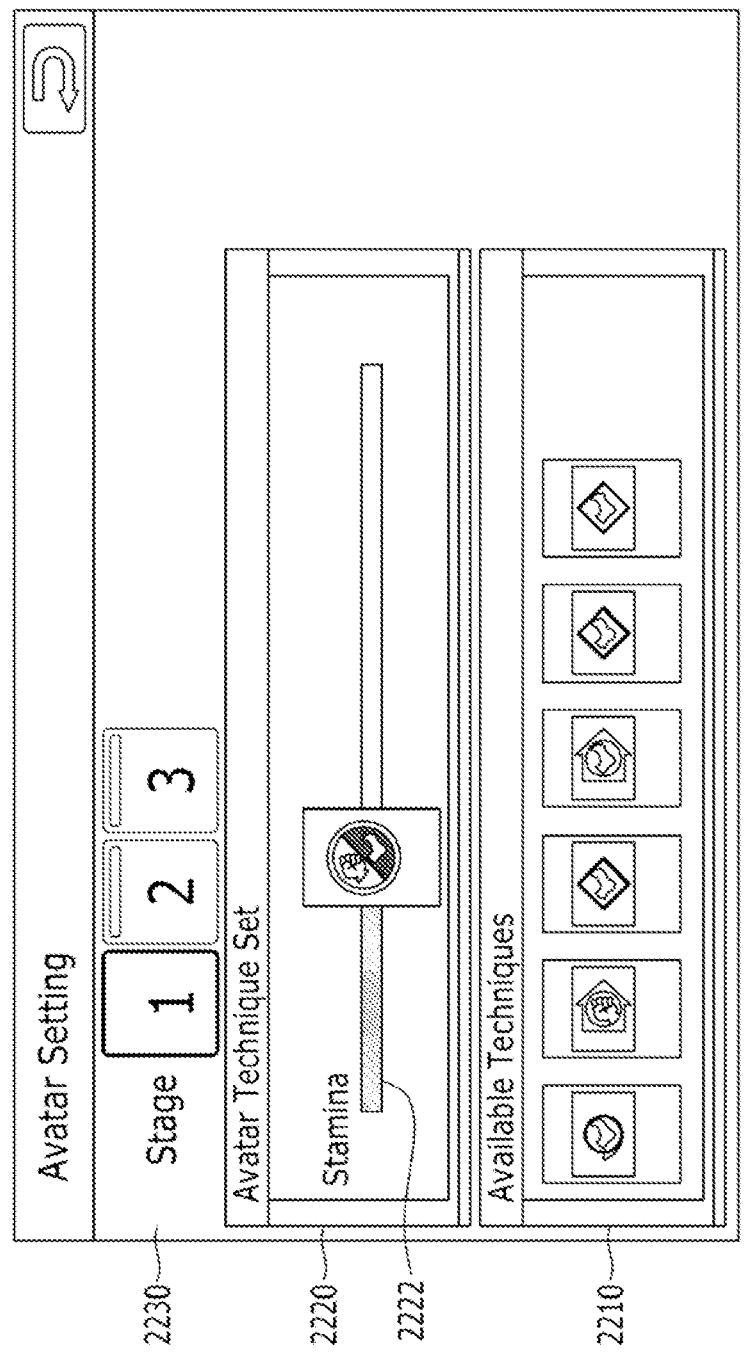
FIG. 22 shows an example of an avatar setting screen displayed when an avatar setting process shown in FIG. 21 is executed.

FIG. 21 is a flowchart of an avatar setting process of a gaming process according to yet another example of the social game, and FIG. 22 shows an example of an avatar setting screen displayed when a avatar setting process shown in FIG. 21 is executed.

Referring to FIG. 21, in the avatar setting process, the controller displays an avatar set screen on the display device (S2110). Referring to FIG. 22, the avatar set screen includes a stage set area 2230 as well as an available technique area 2210 and a technique set area 2220. The stage set area 2230 includes a plurality of stage items corresponding to a plurality of stages.

Next, the controller receives a selection of a stage to be set from among the plurality of stages by the input device (S2113). The player may touch a stage item corresponding to the stage to be set from among the plurality of stage items. Then, the controller displays a technique set area 2220 corresponding to the selected stage on the display device (S2116). Next, the controller sets the avatar technique set for the selected stage (S2120 to S2140) as described in the steps S1820 to S1840. When setting of the avatar technique set for the selected stage is completed (S2145: Yes), the controller determines whether the other stage is selected by the input device (S2145). When the other stage is selected (S2140: Yes), the controller displays a technique set area 2220 corresponding to the other stage on the display device (S2116) and sets the avatar technique set for the other stage (S2120 to S2140). When the other stage is not selected by the input device (S2145: No), the controller terminates the avatar set screen and returns to the main menu. Further, the controller may transmit information on the avatar technique sets for all of the selected stages to the game management server (S2150). The game management server may store information on the avatar technique sets for the player. As a result, the techniques of the avatar can be set for each of the plurality of stages.

Example of Player-to-Player Match-Up Process

Figure 23:
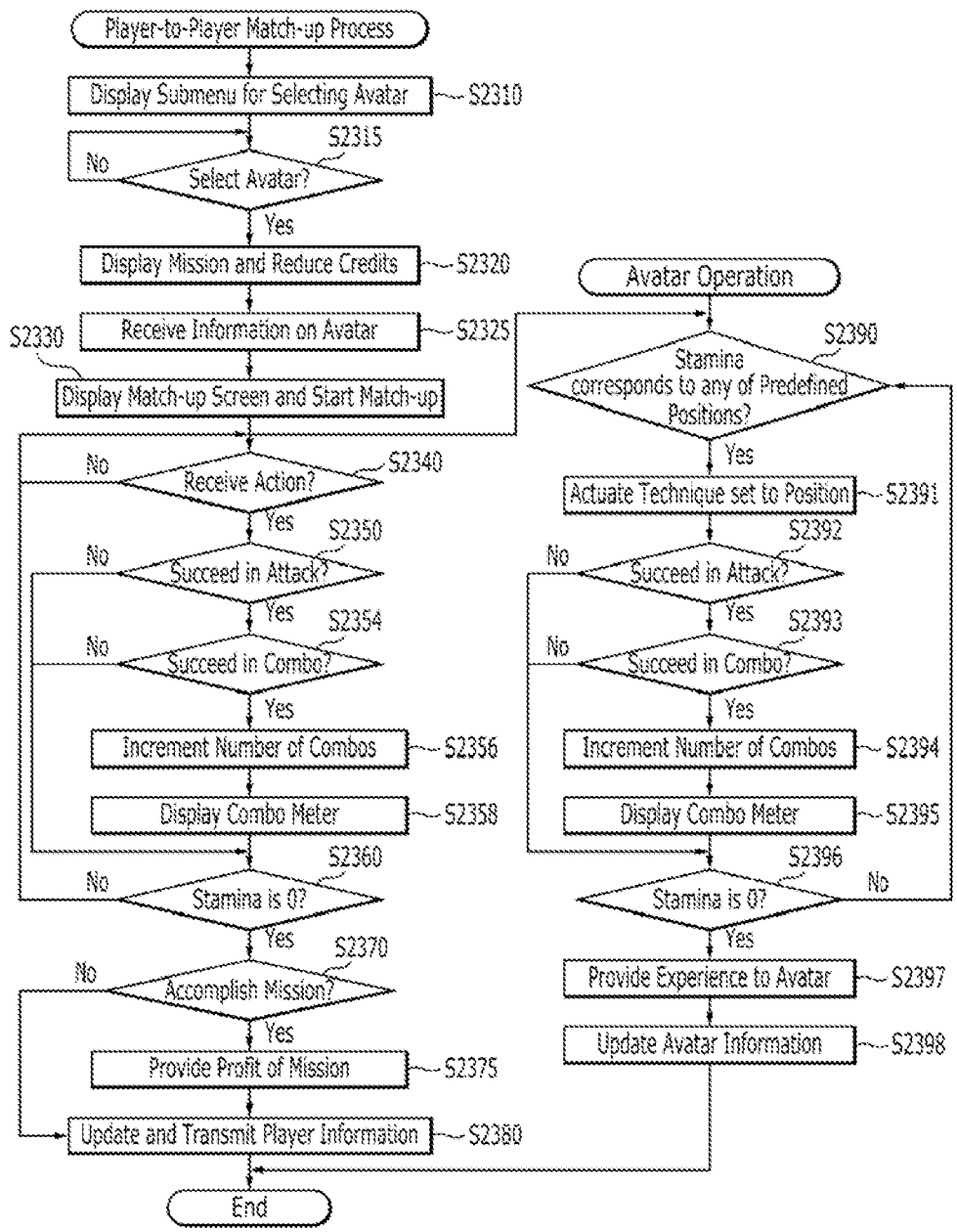
FIG. 23 shows a flowchart of a player-to-player match-up process of a gaming process according to another example of the social game.
Figure 24:
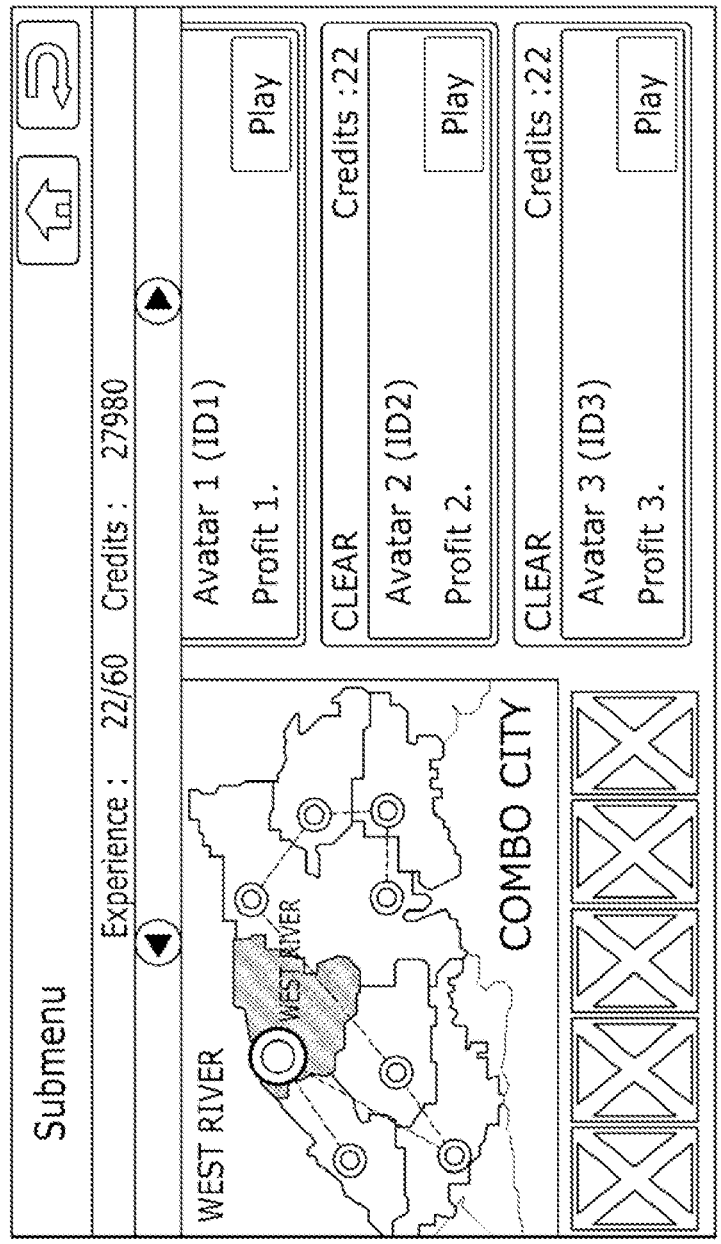
FIG. 24 shows an example of a submenu displayed when a player-to-player match-up process shown in FIG. 23 is executed.
Figure 25:
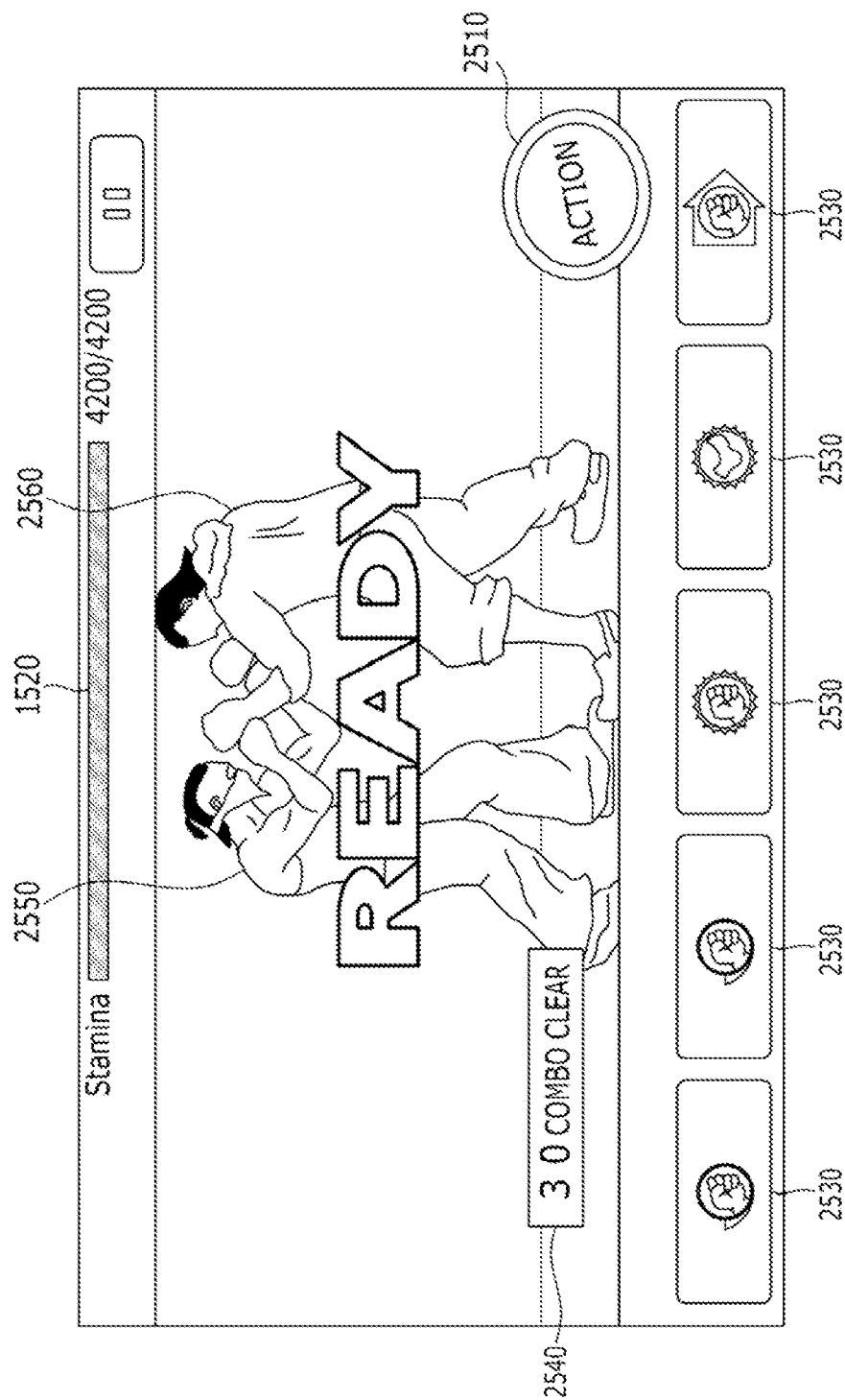
FIG. 25 shows an example of a player-to-player match-up screen.

FIG. 23 shows a flowchart of a player-to-player match-up process of a gaming process according to another example of the social game, FIG. 24 shows an example of a submenu displayed when a player-to-player match-up process shown in FIG. 23 is executed, and FIG. 25 shows an example of a player-to-player match-up screen.

Referring to FIG. 17 again, when the player-to-player match-up item is selected by the input device (S1780), the controller executes a player-to-player match-up process (S1790). Referring to FIG. 23, in the player-to-player match-up process, the controller displays a submenu for selecting an avatar on the display device (S2310). As shown in FIG. 24, the submenu includes a plurality of avatar item corresponding to a plurality of avatars. Each avatar item may include identification information of a player corresponding to the avatar, and the identification information may include at least one of an ID and a name of the player corresponding to the avatar. Each avatar item may display a level of the player corresponding to the avatar together with the identification information such that the player can select the avatar having the similar level to the player. In addition, each avatar item may further include a mission, a credit value required to perform the mission, and a profit provided when the mission is completed. The mission may include acquiring a predetermined number of combos or winning a Fight with the opponent player.

When the avatar is selected by the input device (S2315), the controller displays a mission on the display device and reduces the credits of the player by the credit value required in the mission (S2320). In this case, the controller may transmit the reduced credits to the game management server, and the game management server may update the credits of the player according to the reduced credits. Further, the controller receives information on the avatar from the game management server (S2325). The information on the avatar includes the avatar technique set of the player corresponding to the avatar. Next, the controller displays a match-up screen on the display device as shown in FIG. 25 and starts the player-to-player match-up (S2330). The match-up screen includes an action button 2510 and a stamina meter 2520. The match-up screen may further include a plurality of technique buttons 2530 corresponding to a plurality of techniques. The match-up screen may further include the number of combos to be accomplished (2540). Further, the match-up screen displays the character 2550 corresponding to the player and the avatar 2560 of the other player.

Next, the controller receives an action from the player by using the input device (S2340). The player may input the action by touching the action button 2510 on the display device. Each time the action button 2510 is touched, the plurality of techniques are sequentially performed in the order of the sequence of techniques set in the technique set area 720. Instead of touching the action button 2510, the player may directly touch the technique button 2330 corresponding to a desired technique.

Next, the controller determines whether the attack according to the technique used by the user succeeds (S2350). When the attack from the user succeeds (S2350: Yes), the controller determines whether the successful attack is continuous to a previous successful attack (S2354). When the successful attack is continuous (S2354: Yes), the controller increments the number of combos by one (S2356). The controller displays on the display device a combo meter representing the number of combos that are succeeded (S2358). When the continuous attack fails (S2354: No), the controller does not increment the number of combos.

Next, the controller determines whether the remaining amount of the stamina meter 2520 reaches zero (S2360). The stamina of the stamina meter 2520 may decrease with the lapse of time. When the stamina of the stamina meter 2520 remains (S2360: No), the controller receives the action from the player again (S2340). When the stamina of the stamina meter 2520 reaches zero (S2360: Yes), the controller determines whether the mission is accomplished (S2370). That is, the controller may determine whether the number of combos that are succeeded is equal to or greater than the number of combos required in the mission (S2370). When the mission is accomplished, that is, the number of combos that are succeeded is equal to or greater than the number of combos required in the mission (S2370: Yes), the controller provides the player with the profit of the mission (S2375). According to the profit, the controller updates information of the player (S2380), and ends the match-up. Further, the controller may transmit the updated information to the game management server (S2380), and the game management server may update the information of the player according to the updated information. When the mission is not accomplished (S2370: No), the controller ends the match-up without providing the profit and update the information of the player.

On the other hand, the controller controls the avatar of the opponent player according to the avatar setting when the player uses techniques. That is, the controller determines whether the remaining amount of the stamina of the player corresponds to any one of positions where techniques are set in the avatar technique set (S2390). When the remaining amount of the stamina corresponds to a certain position of the position (S2390: Yes), the controller controls the avatar to actuate the technique that is set in the certain position (S2391). Next, the controller determines whether the attack according to the technique actuated by the avatar succeeds (S2392). When the attack from the avatar succeeds (S2392: Yes), the controller determines whether the successful attack is continuous to a previous successful attack (S2393). When the successful attack is continuous (S2393: Yes), the controller increments the number of combos of the avatar by one (S2394). The controller displays on the display device a combo meter representing the number of combos that are succeeded (S2395). When the continuous attack fails (S2393: No), the controller does not increment the number of combos.

When the remaining amount of the stamina does not correspond to any of the position (S2390: No), the avatar actuates no technique. Further, when the match-up ends, that is, the remaining amount of the stamina reaches zero (S2396: Yes), the game management server provides the avatar with the experience according to the result of the match-up (S2397). That is, the controller transmits a result of the match-up to the game management server, and the game management server provides the avatar with the experience. For example, when the avatar defeats the player, succeeds to prevent the player from accomplishing the mission in the match-up, or acquire a predetermined number of combos, the avatar may acquire a high experience. When the avatar loses or fails to prevent the player from accomplishing the mission in the match-up, the avatar may acquire a low experience. Next, the game management server updates information on the avatar (S2398). That is, the game management server increases the experience of the avatar, and may increment a level of the avatar by one when the experience of the avatar increases to a predetermined value. As such, a player can set his or her own avatar to allow the avatar to Fight other players. As a result, the avatar can acquire the experience such that the level of the avatar can increase.

Another Example of Avatar Setting Process

Figure 26:
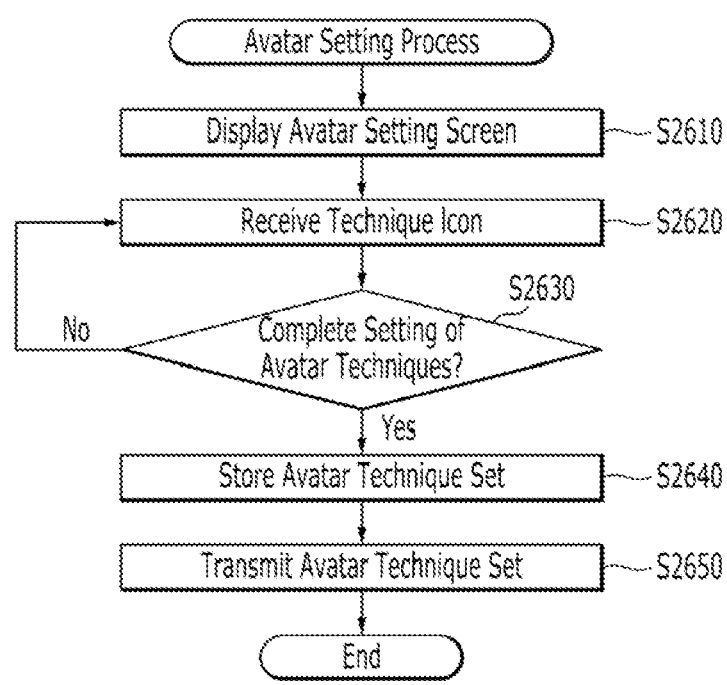
FIG. 26 is a flowchart of an avatar setting process of a gaming process according to yet another example of the social game.
Figure 27:
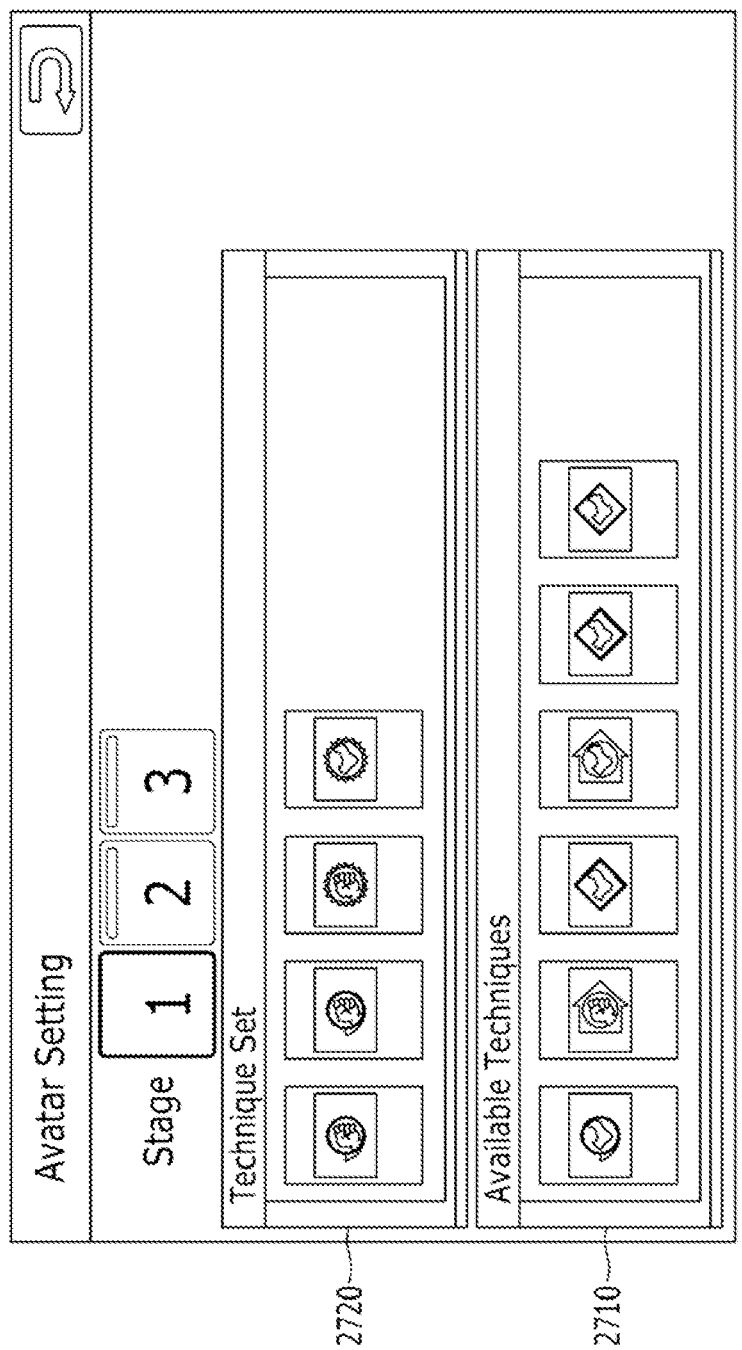
FIG. 27 shows an example of an avatar setting screen displayed when an avatar setting process shown in FIG. 26 is executed.

FIG. 26 is a flowchart of an avatar setting process of a gaming process according to yet another example of the social game, and FIG. 27 shows an example of an avatar setting screen displayed when a avatar setting process shown in FIG. 26 is executed.

Referring to FIG. 26, in an avatar setting process according to another example, the controller displays an avatar set screen on the display device (S2610). Referring to FIG. 27, the avatar set screen includes an available technique area 2710 and a technique set area 2720. The available technique area 2710 includes a plurality of technique icons corresponding to a plurality of techniques that can be used by the player.

Next, the controller receives a technique icon selected by the player by the input device (S2620). As shown in FIG. 27, the user may touch and drag the technique icon from the available technique area 2710, and drop the dragged technique icon on the technique set area 2720.

Next, the controller determines whether setting techniques of an avatar is completed (S2630). When setting the techniques of the avatar is not completed (S2630: No), the controller receives other technique icon by the input device (S2620). When setting of the avatar technique set is completed (S2630: Yes), the controller stores the avatar technique set that has been set (S2640). Setting of the avatar technique set may be completed by touch of a return button on the avatar set screen. Further, the controller may transmit information on the avatar technique set to the game management server (S2650). The game management server may store information on the avatar technique set for the player. In this case, the avatar technique set includes a plurality of techniques, and the plurality of techniques may be randomly selected when the match-up is performed.

On the other hand, the player may set the techniques of the avatar for each of a plurality of stages or some of the plurality of stages as described with reference to FIG. 20 and FIG. 21.

Another Example of Player-to-Player Match-Up Process

Figure 28:
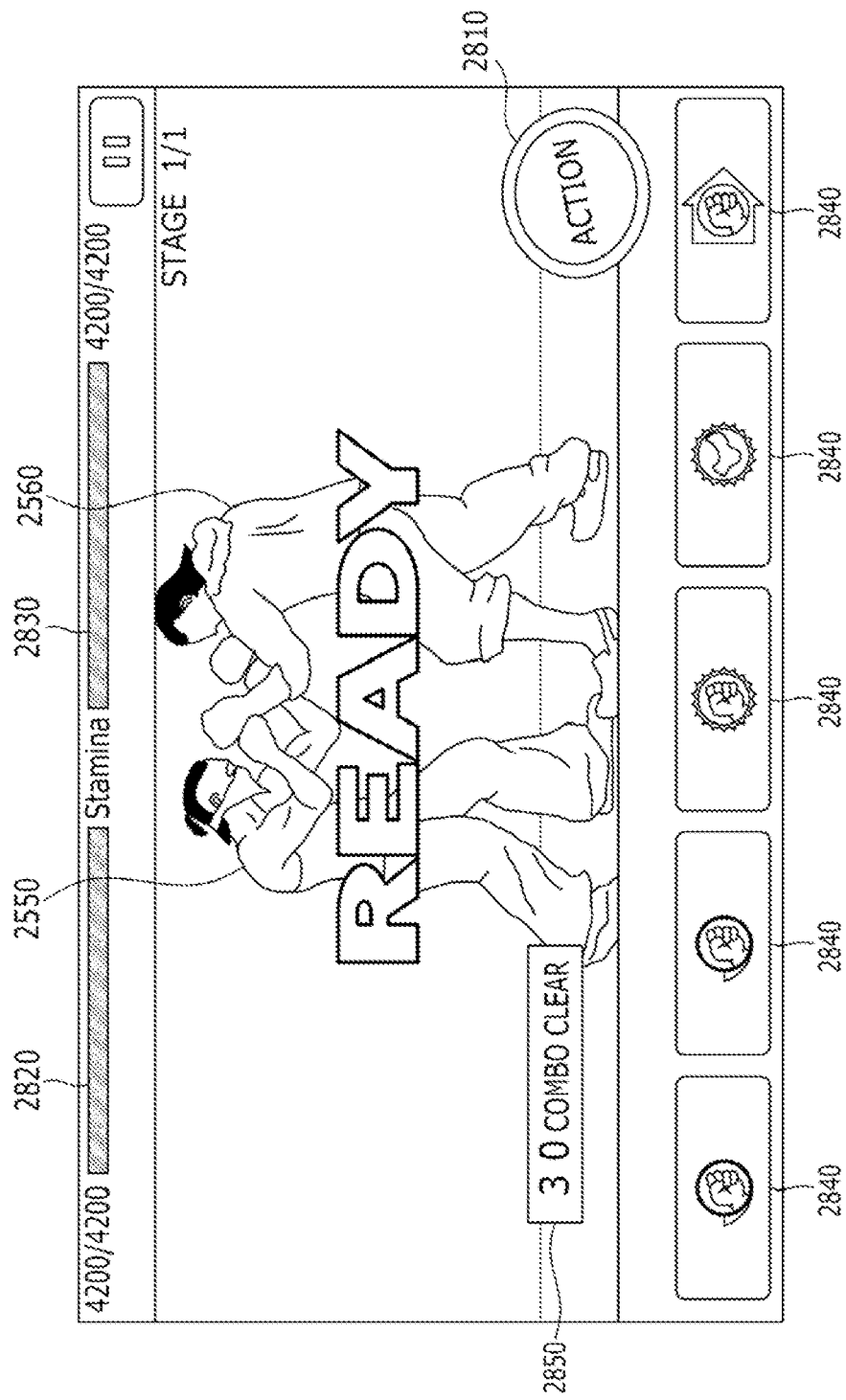
FIG. 28 shows an example of a player-to-player match-up screen according to yet another example of the social game.
Figure 29:
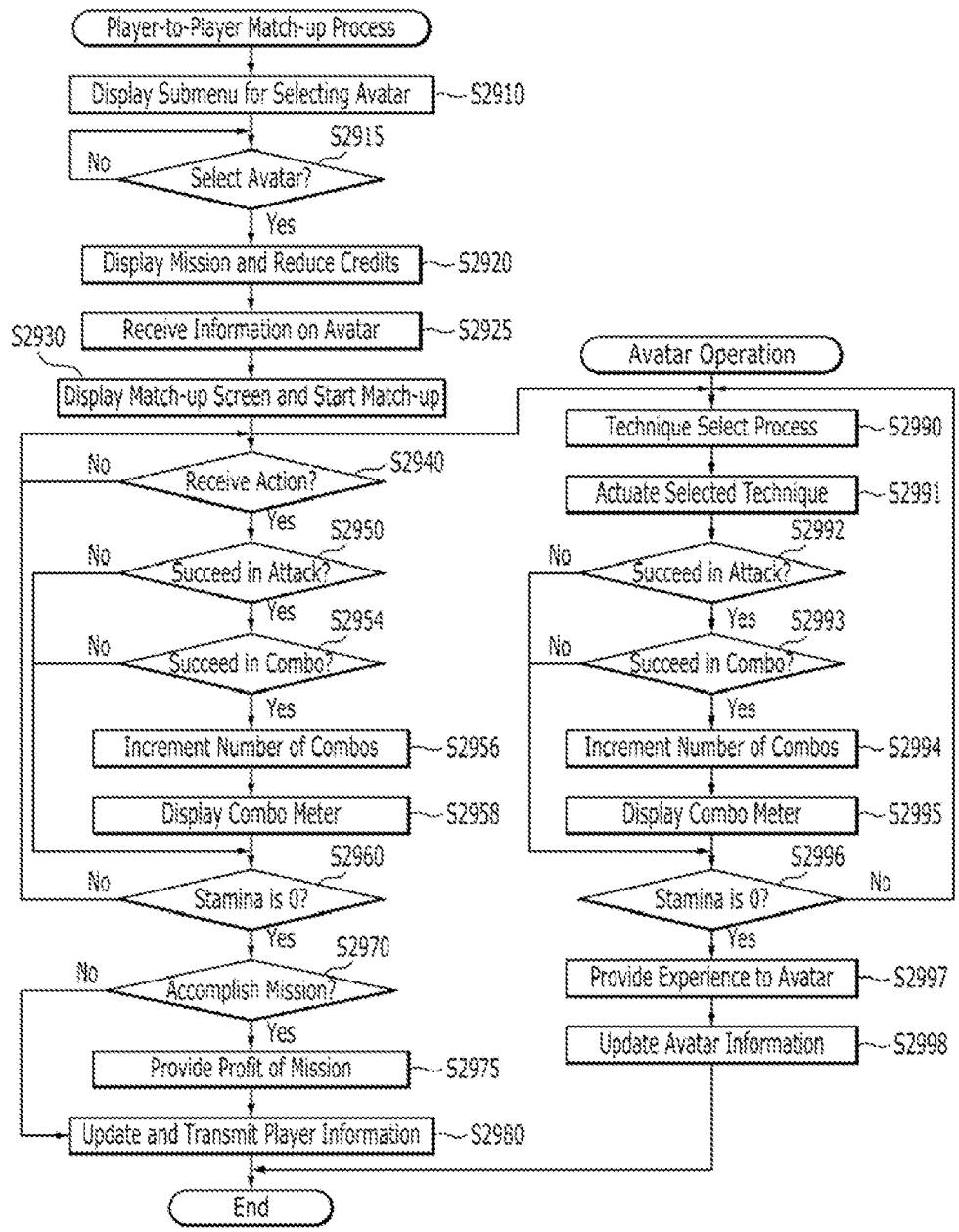
FIG. 29 shows a flowchart of a player-to-player match-up process of a gaming process according to yet another example of the social game.

FIG. 28 shows an example of a player-to-player match-up screen according to yet another example of the social game, and FIG. 29 shows a flowchart of a player-to-player match-up process of a gaming process according to yet another example of the social game.

As shown in FIG. 28, a match-up screen for a player-to-player match-up may include an action button 2810, a stamina meter 2820 of a player, and a stamina meter 2830 of an avatar corresponding to an opponent player. In this case, the stamina of the stamina meter 2820 may be reduced according to damage by an attack of the opponent character, and the stamina of the stamina meter 2830 may be reduced according to damage by an attack of the player. The match-up screen may further include a plurality of technique buttons 2840 corresponding to a plurality of techniques. The match-up screen may further include the number of combos to be accomplished (2850). Further, the match-up screen displays the character 2860 corresponding to the player and the avatar 2870 of the other player.

Referring to FIG. 29, as described in steps S2310, S2315, S2320, S2325, and S2330, the controller displays a match-up screen on the display device and starts the player-to-player match-up with a selected avatar (S2910, S2915, S2920, S2925, and S2930).

Next, the controller receives an action from the player by using the input device (S2940), and determines whether the attack according to the technique used by the user succeeds (S2950). When the attack from the user succeeds (S2950: Yes), the controller reduces the stamina of the stamina bar of the avatar by damage corresponding to the successful attack (S2952). Next, the controller determines whether the successful attack is continuous to a previous successful attack (S2954). When the successful attack is continuous (S2954: Yes), the controller increments the number of combos by one (S2956). The controller displays on the display device a combo meter representing the number of combos that are succeeded (S2958). When the continuous attack fails (S2954: No), the controller does not increment the number of combos.

Next, the controller determines whether the remaining amount of the stamina meter of the player 2820 or the stamina meter of the avatar 2830 reaches zero (S2960). When the stamina of the stamina meter 2820 or 2830 remains (S2960: No), the controller receives the action from the player again (S2940). When the stamina of the stamina meter 2820 or 2830 reaches zero (S2960: Yes), the controller determines whether the mission is accomplished (S2970). When the mission is accomplished (S2970: Yes), the controller provides the player with the profit of the mission (S2975). According to the profit, the controller updates information of the player (S2980), and ends the match-up. Further, the controller may transmit the updated information to the game management server (S2980), and the game management server may update the information of the player according to the updated information. When the mission is not accomplished (S2970: No), the controller ends the match-up without providing the profit and update the information of the player.

On the other hand, the controller or the game management server controls the avatar of the opponent player according to the avatar technique set when the player uses techniques. In this case, the controller or the game management server performs a technique select process (S2990). That is, the controller or the game management server randomly selects any one technique from among the plurality of techniques included in the avatar technique set. The controller or the game management server may randomly select any one technique based on the remaining amount of the stamina meter 2620 of the player. Next, the controller controls the avatar to actuate the selected technique (S2991). The controller determines whether the attack according to the technique actuated by the avatar succeeds (S2992). When the attack from the avatar succeeds (S2992: Yes), the controller determines whether the successful attack is continuous to a previous successful attack (S2993). When the successful attack is continuous (S2993: Yes), the controller increments the number of combos of the avatar by one (S2994). The controller displays on the display device a combo meter representing the number of combos that are succeeded (S2995). When the continuous attack fails (S2993: No), the controller does not increment the number of combos.

Further, when the match-up ends, that is, the remaining amount of the stamina meter 2820 or 2830 reaches zero (S2996: Yes), the controller or the game management server provides the avatar with the experience according to the result of the match-up (S2997). Next, the game management server updates information on the avatar (S2998).

Technique Select Process

Figure 30:
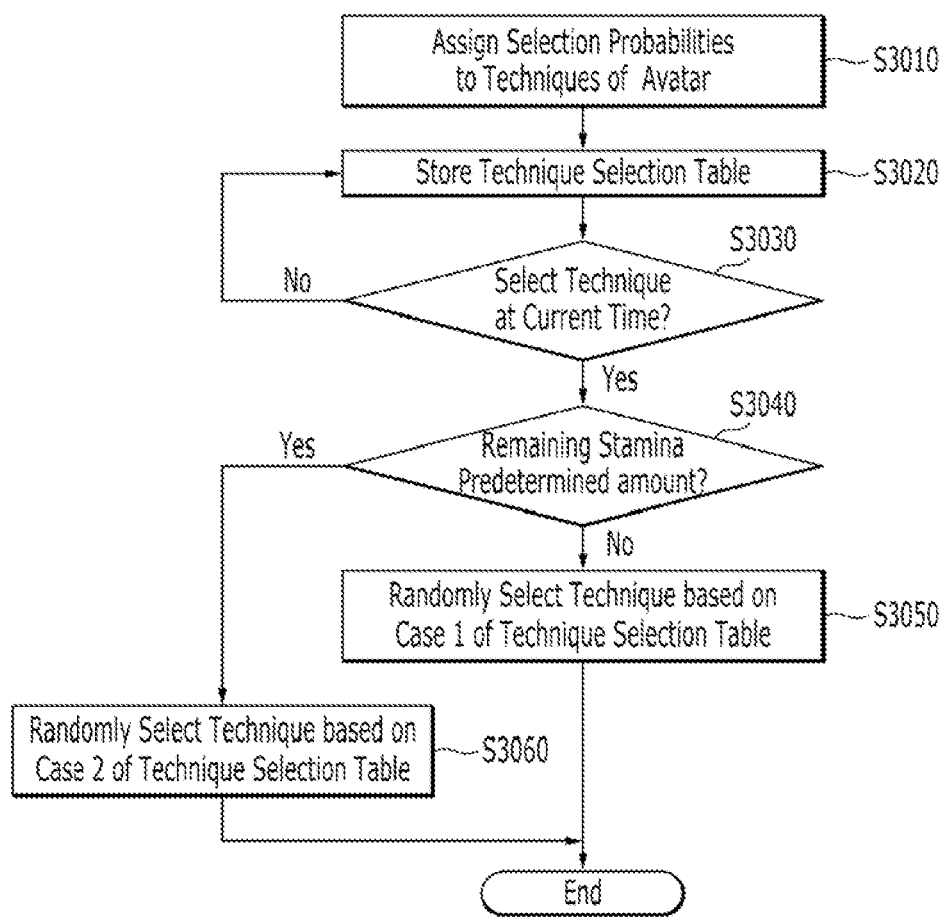
FIG. 30 is a flowchart of a technique select process according to an example of the social game.

FIG. 30 is a flowchart of a technique select process according to an example of the social game, and FIG. 31 shows an example of a technique selection table.

Referring to FIG. 30, when the game management server receives information on an avatar technique set for a certain player (S26650 of FIG. 26), the game management server assigns a plurality of selection probabilities to a plurality of techniques included in the avatar technique set (S3010). As shown in FIG. 31, the game management server may assign higher selection probability to a technique having lower power (Case 1), or may assign higher selection probability to a technique having higher power (Case 2). It is assumed in FIG. 31 that the plurality of techniques include technique 1, technique 2, technique 3, technique 4, and technique 5 in descending order of power. The selection probability may be mapped to a range of random numbers. The game management server stores mappings between the selection probabilities and the techniques to a memory as a technique selection table (S3020). The technique selection table may be included in the information on the avatar when the information on the avatar is provided in the game terminal (S2925 of FIG. 29).

When the technique select process is performed (S2990 of FIG. 29), the controller or the game management server determines whether to select or not a technique of the avatar from among the plurality of techniques included in the avatar technique set at a current time (S3030). The controller or the game management server may select the technique of the avatar each time a predetermined time is lapsed. When determining to select the technique of the avatar (S3030: Yes), the controller or the game management server determines whether the remaining amount of the stamina meter 2820 is greater than a predetermined amount (S3040). When the remaining amount of the stamina meter 2820 is not greater than the predetermined amount (S3040: No), the controller or the game management server randomly selects any one technique from among the plurality of techniques based on the case 1 of the technique selection table (S3050). When the remaining amount of the stamina meter 2820 is greater than the predetermined amount (S3040: Yes), the controller or the game management server randomly selects any one technique from among the plurality of techniques based on the case 2 of the technique selection table (S3060). On the other hand, when determining to not select the technique of the avatar (S3030: No), the controller or the game management server determines waits until the predetermined time is lapsed.

As such, even though the player does not control his or her own avatar, the avatar can actuate a selected technique to Fight an opponent character each time the technique is selected. Accordingly, the player can allow the avatar to Fight the opponent character by selecting a plurality of techniques from among a plurality of available techniques. Further, because a technique having a relatively high power is selected with a high probability when the stamina of the opponent character is consumed enough, it can be easy to turn a match-up around.

Effective Technique

Next, an effective technique determination process for determining whether an actuated technique is effect or not is described with reference to FIG. 32, FIG. 33, FIG. 34A, FIG. 34B, and FIG. 34C.

Figure 33:
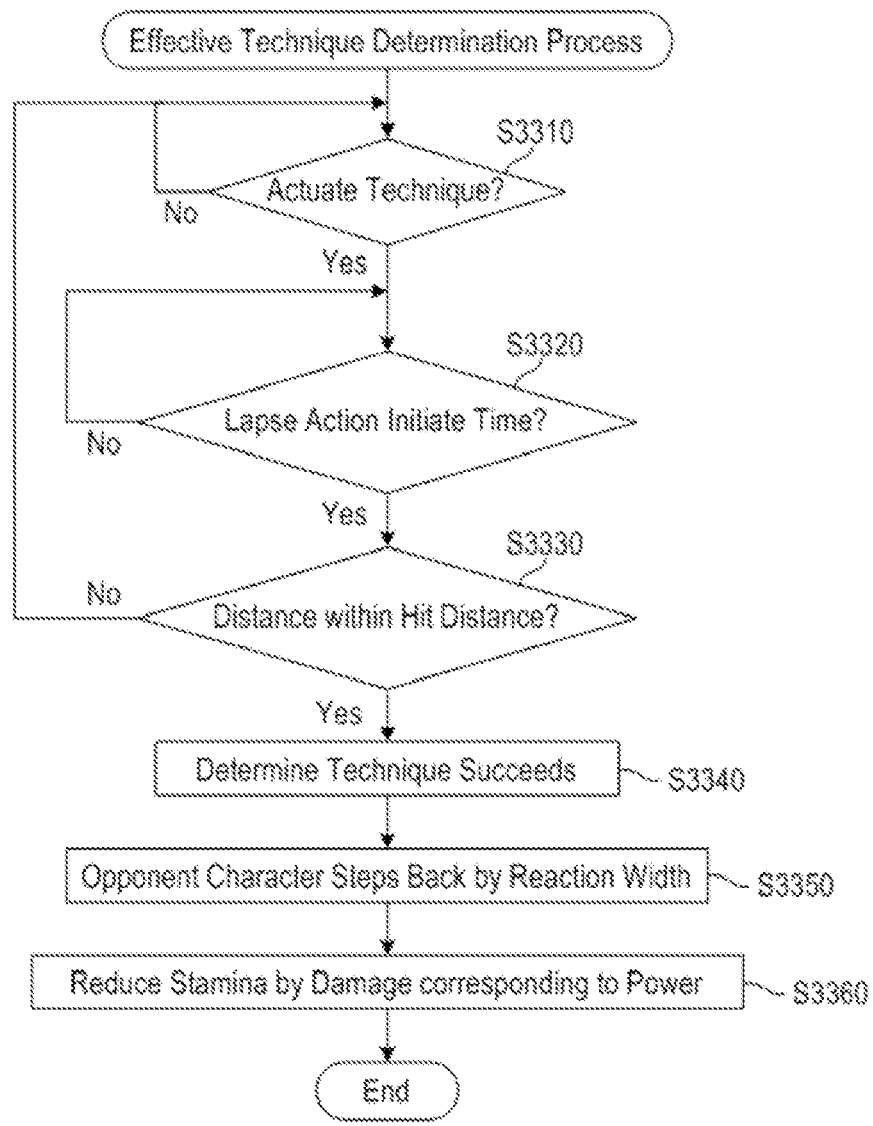
FIG. 33 is a flowchart an effective technique determination process according to an example of the social game.
Figure 34A:
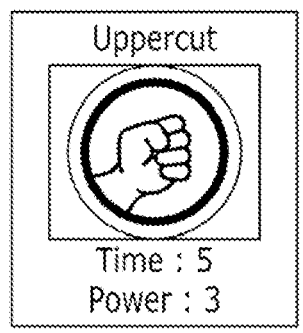
FIG. 34A, FIG. 34B and FIG. 34C show examples of techniques.
Figure 34B:
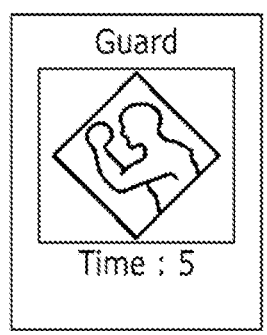
Figure 34C:
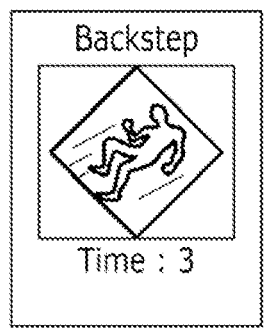

FIG. 32 shows an attribute of a technique used in a game control method according to an example of the social game, FIG. 33 is a flowchart an effective technique determination process according to an example of the social game, and FIG. 34A, FIG. 34B and FIG. 34C show examples of techniques.

The controller determines whether the technique actuated by a player or an avatar succeeds or not in step S1150, S2350, S2392, S2950, or S2992 of FIG. 10, FIG. 22, or FIG. 29. In this case, as shown in FIG. 32, a technique has a hit distance, a reaction width, an action initiate time, and a power according to its type. Further, when a character actuates the technique, the technique is initiated after the action initiate time is lapsed from a time when the technique is actuated. If the technique of the character is initiated when a distance between the character and an opponent character is within the hit distance, the technique succeeds. Further, when the character actuates the technique, the technique is initiated after the action initiate time is lapsed from a time when the technique is actuated. When the actuated technique succeeds, the opponent character reacts by the reaction width and is damaged by the power of actuated technique.

Referring to FIG. 33, when a technique of a character is actuated by an input device (S3310), a controller determines whether an action initiate time of the technique is lapsed (S3320). When the action initiate time of the technique is lapsed (S3320: Yes), the controller determines whether a distance between the character and an opponent character is within a hit distance of the technique (S3330). When the distance between the character and the opponent character is within the hit distance of the technique (S3330: Yes), the controller determines that the technique succeeds (S3340). Further, the controller displays an image that the opponent character steps back by a reaction width of the technique (S3350). The controller reduces stamina of the opponent character by a damage corresponding to a power of the technique (S3360). If the stamina is reduced with the lapse of time, the step S3360 may be omitted.

Referring to FIG. 34A, FIG. 34B, and FIG. 34C, a technique icon corresponding to each technique may include an image for indicating a type of the technique and an indicator (time) for indicating an action initiate time of the technique.

When the type of the technique is an attack technique, the technique icon may further include an indicator (power) for indicating a power of the technique as shown in FIG. 34A. Further, the technique icon may be an icon for indicating any one of a first for a first attack or an elbow attack, a body for a body attack, a shoulder attack, or a grappling attack, a leg for a leg attack, and/or a head for a head attack. FIG. 34B shows that the type of the technique is a guard technique for blocking the attack from the opponent character, and FIG. 34C shows that the type of the technique is a backstep technique for avoiding the attack from the opponent character. In this case, the power of the technique may be increased according to a level of the player.

In some examples, a game application may provide a social network service for allowing a player to join a team.

Examples of the social game can also be embodied as a computer readable program on a computer-readable recording medium. The computer readable recording medium is any data storage device that can store data that can be read thereafter by a computer. Examples of the computer readable recording medium include ROMs, RAMs, CD-ROMs, magnetic tapes, floppy disks, and optical data storage devices. The computer readable recording medium can also be distributed over a network coupled computer system so that the computer readable code is stored and executed in a distributed fashion.

While this invention has been described in connection with what is presently considered to be practical examples, it is to be understood that the invention is not limited to the disclosed examples, but, on the contrary, is intended to cover various modifications and equivalent arrangements included within the spirit and scope of the appended claims.

What is claimed is:

1. A game controlling method in a social game in which match-ups are conducted by registered users using one or more items selected from among various available possession items, the registered users including a first subset of registered users who belong to a group and a second subset of registered users who do not belong to the group, the method comprising:

storing a database in a memory device of a server, which server is connected to a plurality of game terminals via a network and which database comprises a plurality of general items and a plurality of special items, with 1) the general items being items which any of the registered users may possess simultaneously and which, on an item-by-item basis, are all the same irrespective of which registered users possess them; and 2) the special items being items which registered users who belong to the group may possess simultaneously but which none of the registered users who do not belong to the group may possess;

receiving at the server a first input from a first registered user, wherein 1) the first input has been generated via an input device of a first game terminal of the plurality of game terminals and has been transmitted via the network to the server, and 2) the first input comprises a request by the first registered user to generate said group;

in response to the request from the first registered user to generate the group, updating the stored database to include the group and to associate with the group one or more of the special items;

receiving at the server a second input from a second registered user, wherein 1) the second input has been generated via an input device of a second game terminal of the plurality of game terminals and has been transmitted via the network to the server, and 2) the second input comprises a request by the second registered user to participate in the group; and in response to the request from the second registered user to participate in the group, updating the stored database to associate the second registered user with the group and to give the second registered user the right to possess one or more of the special items associated with the group.

2. The game controlling method of claim 1, wherein the special items are more advantageous to play of the game than the general items are.

3. The game controlling method of claim 2, wherein the first registered user may associate one or more of said special items with the group by paying an actual monetary possession cost.

4. The game controlling method of claim 3, wherein the first registered user may use credit to obtain funds from which the monetary possession cost can be paid.

5. The game controlling method of claim 3, wherein monetary possession cost increases with elapsed time.

6. The game controlling method of claim 1, wherein the registered users may acquire items selected from among the various available possession items by paying an actual monetary possession cost.

7. The game controlling method of claim 6, wherein the registered users may use credit to obtain funds from which the monetary possession cost can be paid.

8. The game controlling method of claim 6, wherein the monetary possession cost increases with elapsed time.

9. A server configured to provide a game in which match-ups are conducted by registered users using one or more items selected from among various available possession items, the registered users including a first subset of registered users who belong to a group and a second subset of registered users who do not belong to the group, the server having a database in a memory device thereof in which a plurality of general items and a plurality of special items are registered, with 1) the general items being items which any of the registered users may possess simultaneously and which, on an item-by-item basis, are all the same irrespective of which registered users possess them; and 2) the special items being items which registered users who belong to the group may possess simultaneously but which none of the registered users who do not belong to the group may possess; and the server being programmed to perform the following steps:

receiving via a network a first input from a first registered user, which first input comprises a request by the first registered user to generate said group;

in response to the request from the first registered user to generate the group, updating the stored database to include the group and to associate with the group one or more of the special items;

receiving via the network a second input from a second registered user, which second input comprises a request by the second registered user to participate in the group; and in response to the request from the second registered user to participate in the group, updating the stored database to associate the second registered user with the group and to give the second registered user the right to possess one or more of the special items associated with the group.

\* \* \* \* \*